(12) United States Patent
Radev et al.

(10) Patent No.: US 12,111,079 B2
(45) Date of Patent: Oct. 8, 2024

(54) ENCLOSED SOLAR THERMAL ENERGY GENERATION SYSTEM AND METHODS OF OPERATION

(71) Applicant: SolarSteam Inc., Calgary (CA)

(72) Inventors: Apostol Ivanov Radev, Calgary (CA); Samuel DeSaulniers, Calgary (CA); Robert Garth, Calgary (CA)

(73) Assignee: SolarSteam Inc., Calgary (CA)

(*) Notice: Subject to any disclaimer, the term of this patent is extended or adjusted under 35 U.S.C. 154(b) by 0 days.

(21) Appl. No.: 18/543,227

(22) Filed: Dec. 18, 2023

(65) Prior Publication Data

US 2024/0117999 A1    Apr. 11, 2024

Related U.S. Application Data

(63) Continuation of application No. PCT/CA2023/050159, filed on Feb. 7, 2023.
(Continued)

(51) Int. Cl.
| | |
|---|---|
| F24S 40/10 | (2018.01) |
| F24S 10/70 | (2018.01) |
| F24S 23/70 | (2018.01) |
| F24S 23/74 | (2018.01) |
| F24S 30/00 | (2018.01) |
| F24S 30/425 | (2018.01) |
| F24S 25/00 | (2018.01) |

(52) U.S. Cl.
CPC .............. *F24S 40/10* (2018.05); *F24S 10/70* (2018.05); *F24S 23/74* (2018.05); *F24S 23/745* (2018.05); *F24S 23/82* (2018.05); *F24S 30/425* (2018.05); *F24S 2025/017* (2018.05); *F24S 2030/11* (2018.05); *F24S 2030/133* (2018.05); *F24S 2030/15* (2018.05)

(58) Field of Classification Search
CPC ........... F24S 23/74; F24S 40/10; F24S 30/425
See application file for complete search history.

(56) References Cited

U.S. PATENT DOCUMENTS

| | | | | |
|---|---|---|---|---|
| 2,906,257 A | * | 9/1959 | Abbot .................... | F24S 10/45 |
| | | | | 126/696 |
| 3,982,306 A | * | 9/1976 | Curry .................... | B42F 15/066 |
| | | | | 24/462 |

(Continued)

FOREIGN PATENT DOCUMENTS

| | | | | |
|---|---|---|---|---|
| CN | 110476023 A | * | 11/2019 | ........... A01G 9/1407 |
| FR | 2 439 424 A | | 5/1980 | |

(Continued)

OTHER PUBLICATIONS

CN-110476023-A (Year: 2019).*

(Continued)

*Primary Examiner* — Jorge A Pereiro
(74) *Attorney, Agent, or Firm* — Akerman, LLP

(57) ABSTRACT

The invention relates to enclosed solar parabolic trough reflector systems for thermal heat generation that can ultimately be used in various applications. The system includes a modular dual arch building design with a transparent building envelope and a reflector assembly connected within the building through a bearing assembly. The system is particularly suited for solar heat collection in harsh environment.

17 Claims, 45 Drawing Sheets

Related U.S. Application Data

(60) Provisional application No. 63/308,363, filed on Feb. 9, 2022.

(56) References Cited

U.S. PATENT DOCUMENTS

| | | | | |
|---|---|---|---|---|
| 4,078,549 | A * | 3/1978 | McKeen | F24S 30/425 |
| | | | | 126/606 |
| 4,114,594 | A * | 9/1978 | Meyer | F24S 30/425 |
| | | | | 126/606 |
| 4,184,482 | A * | 1/1980 | Cohen | F24S 23/745 |
| | | | | 136/246 |
| 4,469,938 | A * | 9/1984 | Cohen | G01S 3/7861 |
| | | | | 126/696 |
| 4,480,418 | A * | 11/1984 | Ventrella | E04B 1/1906 |
| | | | | 403/171 |
| 5,191,876 | A * | 3/1993 | Atchley | F24S 23/745 |
| | | | | 126/576 |
| 5,228,258 | A * | 7/1993 | Onoda | B64G 99/00 |
| | | | | 343/915 |
| 8,707,948 | B2 * | 4/2014 | Harding | F24S 40/52 |
| | | | | 126/599 |
| 8,748,731 | B2 * | 6/2014 | MacGregor | A01G 9/243 |
| | | | | 136/246 |
| 8,887,712 | B2 * | 11/2014 | von Behrens | F24S 80/50 |
| | | | | 126/621 |
| 8,915,244 | B2 | 12/2014 | von Behrens | |
| 9,322,574 | B2 * | 4/2016 | von Behrens | G02B 19/0042 |
| 9,395,514 | B2 * | 7/2016 | Clark | G02B 7/183 |
| 10,620,294 | B2 * | 4/2020 | Lamkin | G02B 5/04 |
| 11,183,768 | B1 * | 11/2021 | Taylor | H01Q 19/175 |
| 2005/0206579 | A1 * | 9/2005 | Allen | H01Q 15/20 |
| | | | | 343/915 |
| 2010/0032016 | A1 * | 2/2010 | Gee | G02B 5/10 |
| | | | | 136/259 |
| 2010/0258702 | A1 * | 10/2010 | Werner | F24S 23/74 |
| | | | | 248/200 |
| 2011/0073104 | A1 * | 3/2011 | Dopp | F24S 10/45 |
| | | | | 126/684 |
| 2012/0160235 | A1 * | 6/2012 | Terry | F24S 25/65 |
| | | | | 126/696 |
| 2012/0180849 | A1 * | 7/2012 | Bettencourt | B01J 19/127 |
| | | | | 136/248 |
| 2013/0312799 | A1 * | 11/2013 | Hotes | E04H 15/48 |
| | | | | 135/93 |
| 2015/0083177 | A1 * | 3/2015 | Hotes | E04H 15/32 |
| | | | | 135/120.1 |
| 2019/0154079 | A1 * | 5/2019 | Shapiro | F16B 7/185 |
| 2022/0011019 | A1 * | 1/2022 | Werner | F24S 23/74 |
| 2022/0181787 | A1 * | 6/2022 | Taylor | H01Q 1/288 |

FOREIGN PATENT DOCUMENTS

| | | | | |
|---|---|---|---|---|
| GB | 1394774 | A * | 5/1975 | A44B 19/16 |
| GB | 2 032 129 | A | 4/1980 | |
| WO | WO-2012062732 | A1 * | 5/2012 | B23P 13/04 |
| WO | WO 2013/027229 | A2 | 2/2013 | |
| WO | WO 2016/030831 | A1 | 3/2016 | |

OTHER PUBLICATIONS

International Search Report issued on May 1, 2023 in PCT/CA2023/050159 (3 pages).

Written Opinion of the International Searching Authority issued on May 1, 2023 in PCT/CA2023/050159 (3 pages).

\* cited by examiner

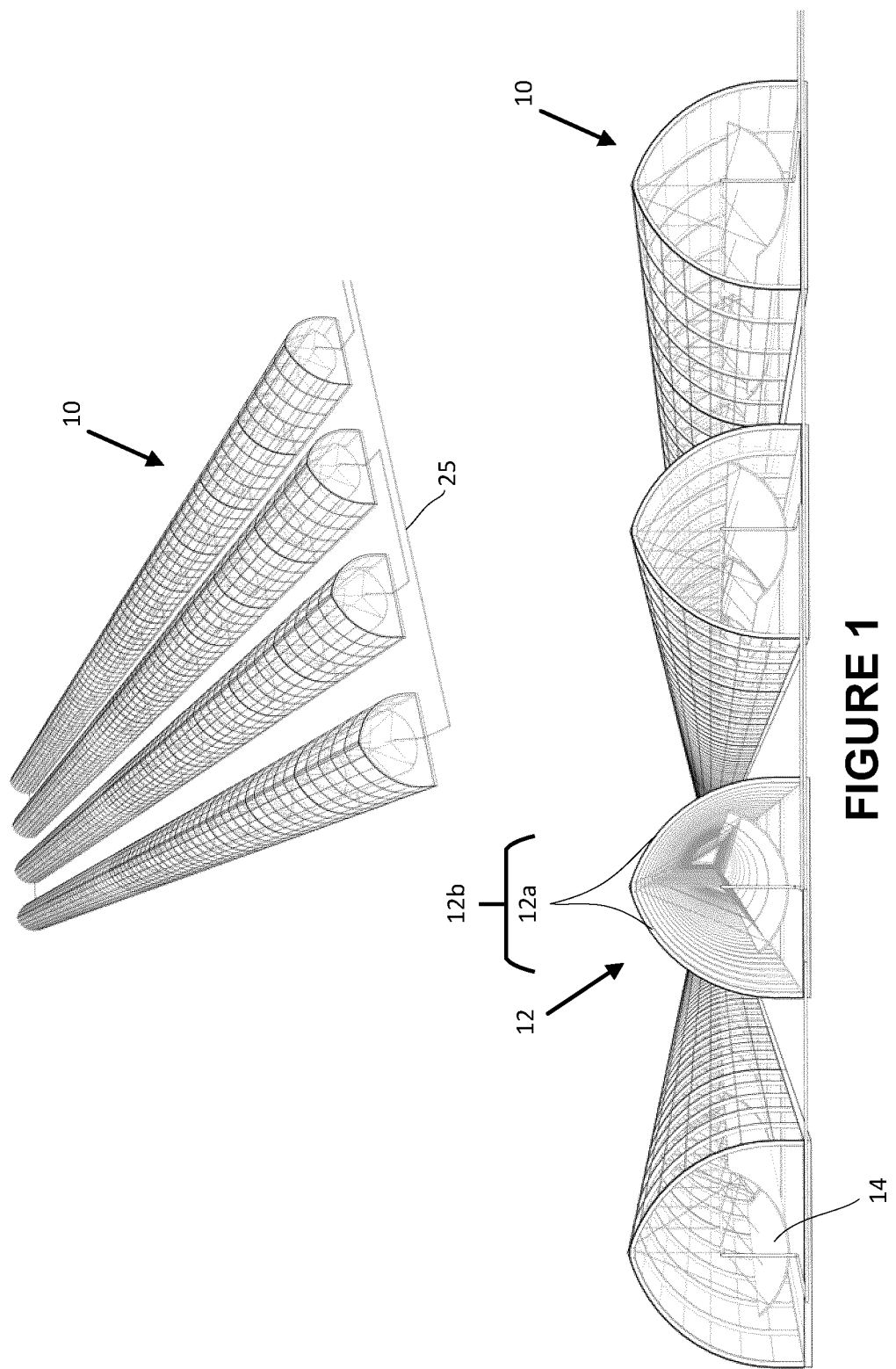

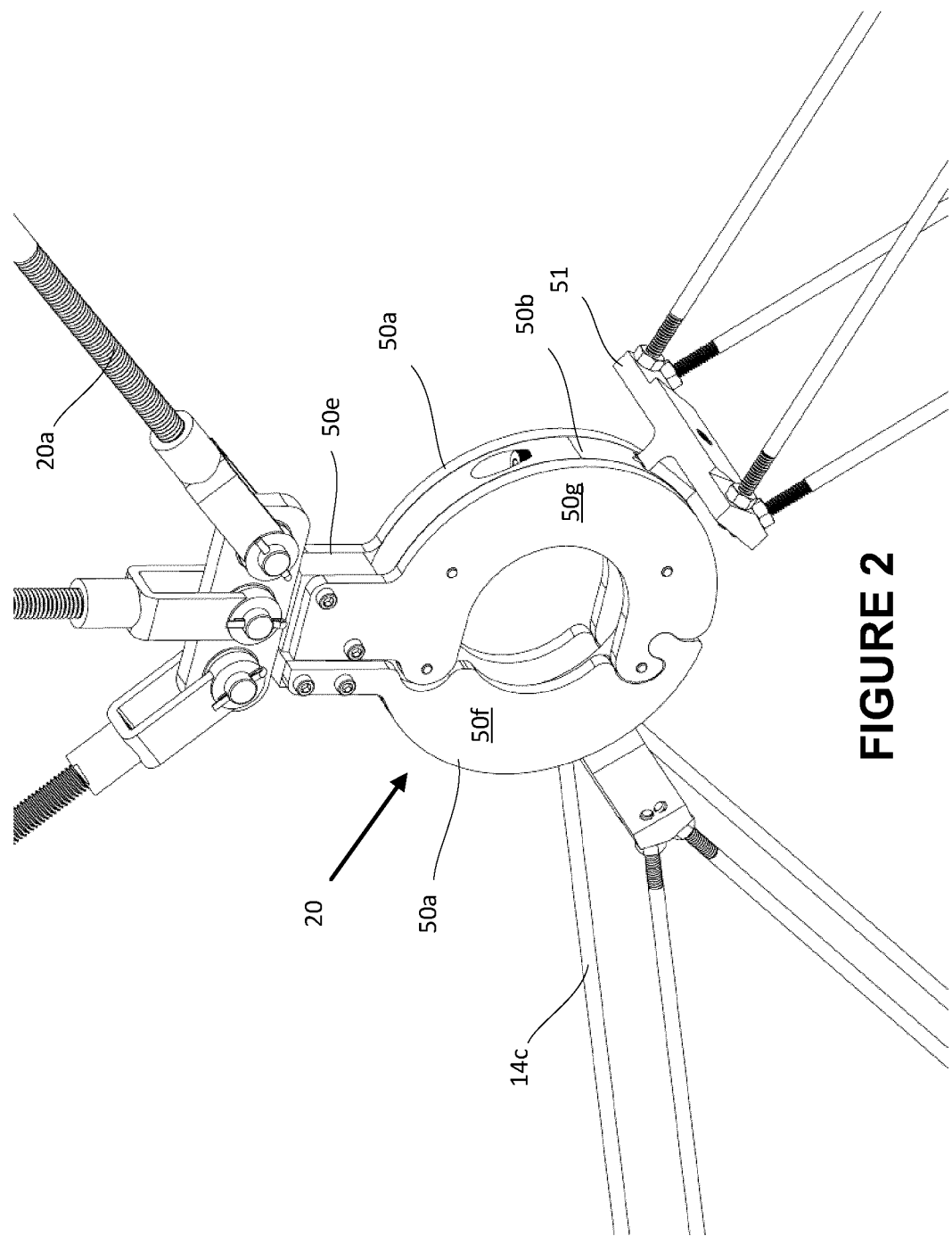

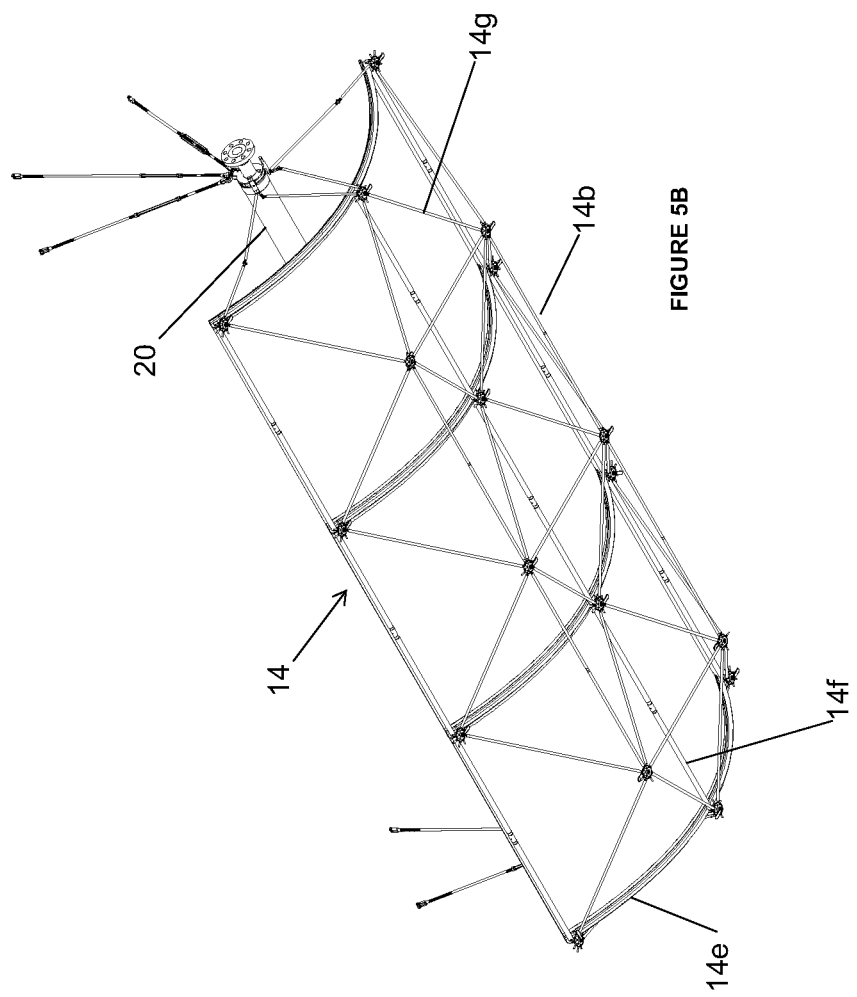

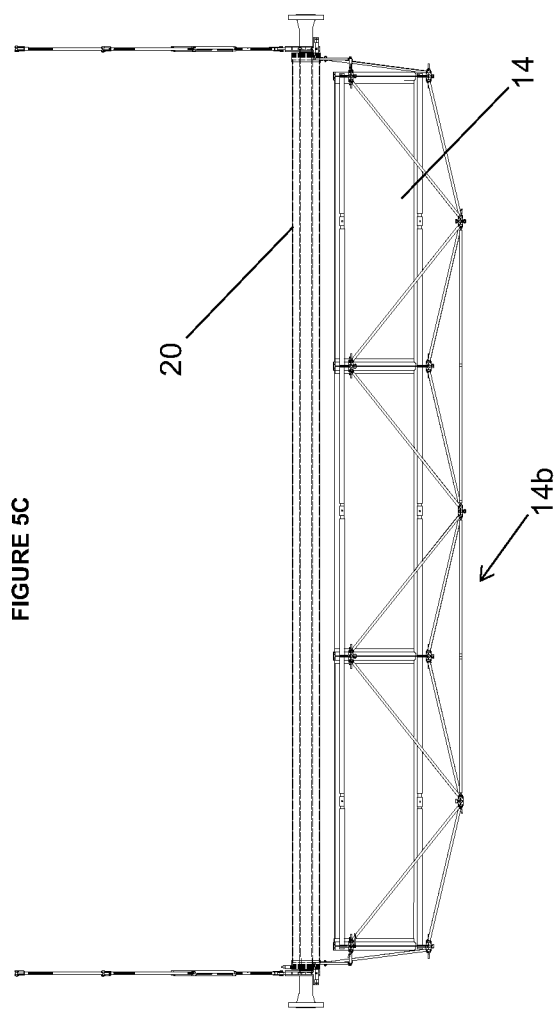

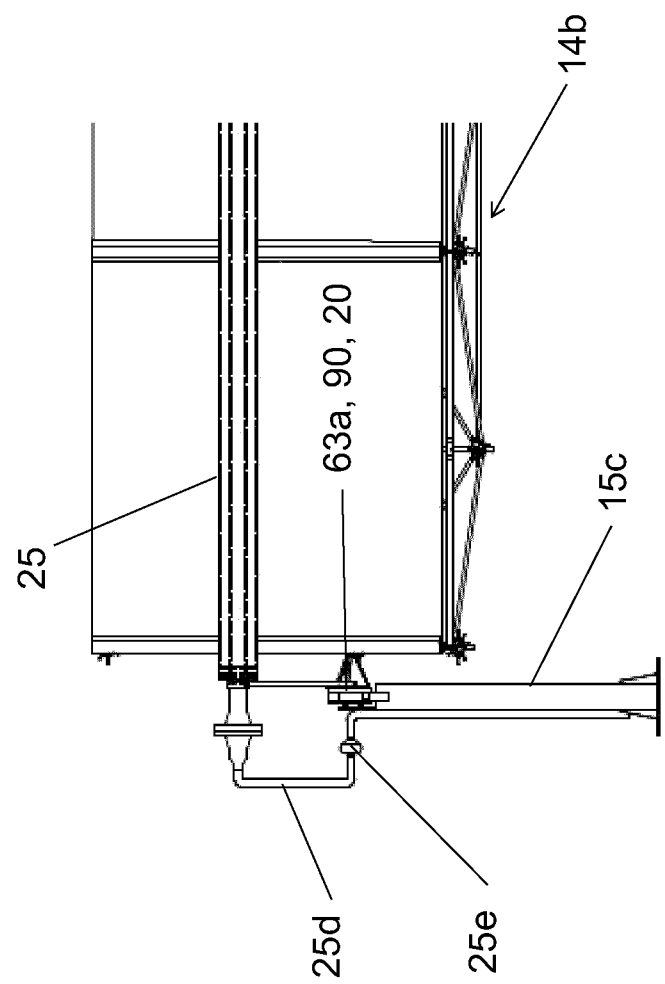

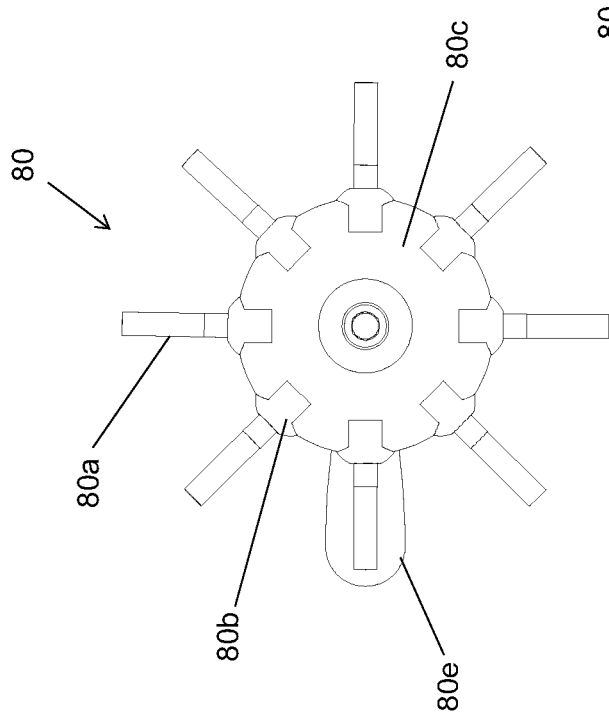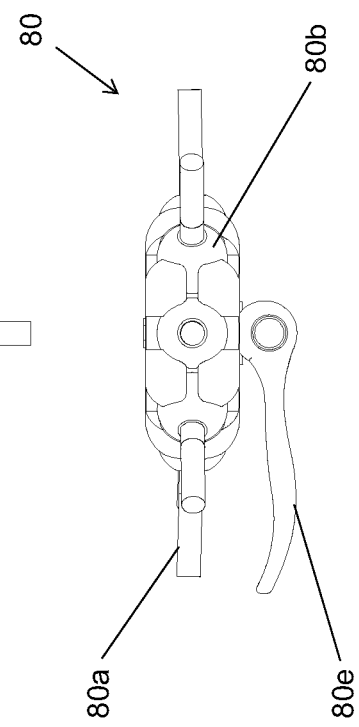

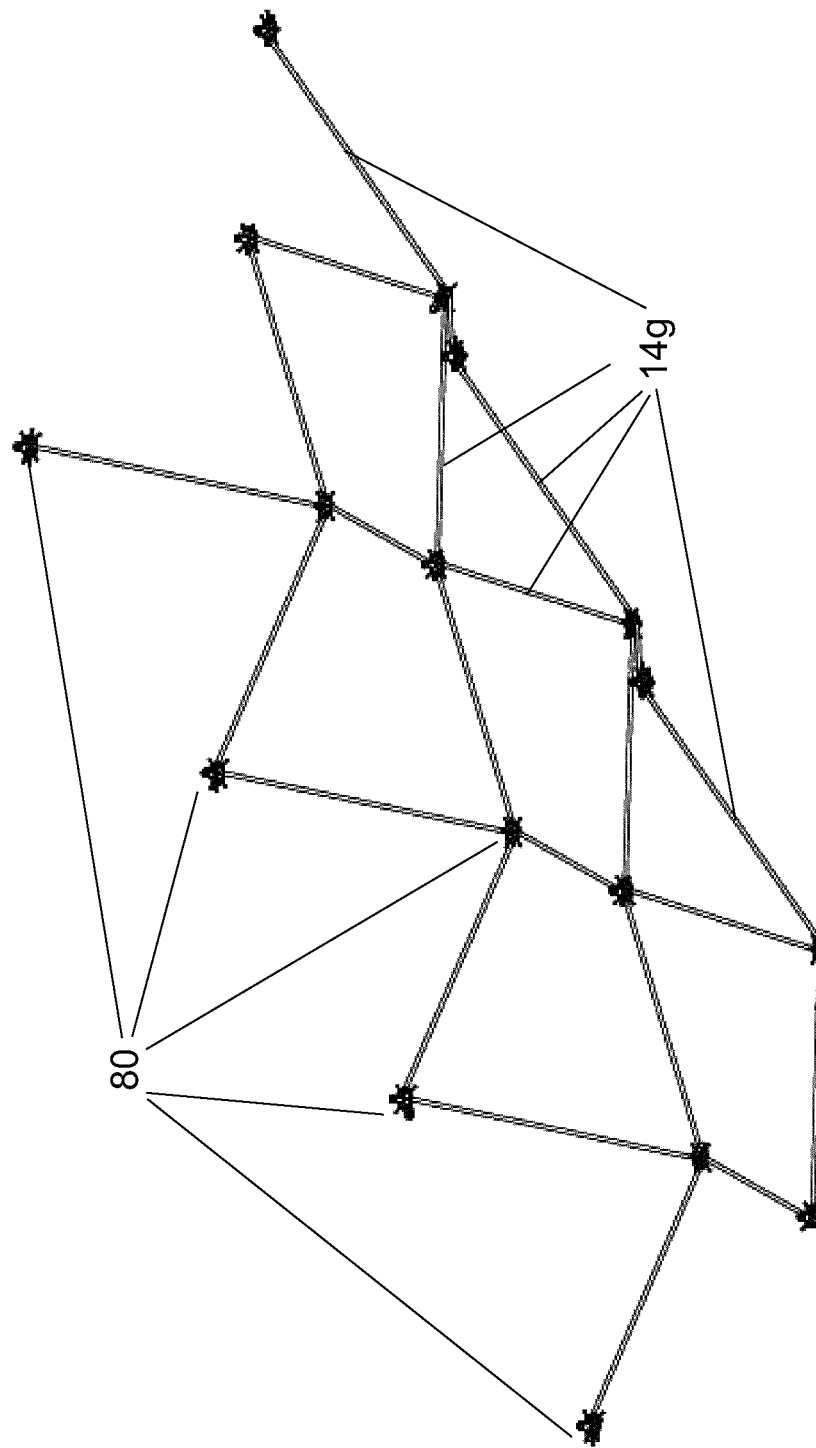

ENCLOSED SOLAR THERMAL ENERGY GENERATION SYSTEM AND METHODS OF OPERATION

CROSS-REFERENCE TO RELATED APPLICATIONS

The present application is a continuation application pursuant to 35 U.S.C. §§ 111 (a), 120 and 363 of Patent Cooperation Treaty App. No. PCT/CA2023/050159, titled "Enclosed Solar Thermal Energy Generation System and Methods of Operation," filed on Feb. 7, 2023, and currently; PCT/CA2023/050159 claims priority to U.S. Provisional App. 63/308,363, titled "Enclosed Solar Thermal Energy Generation System and Methods of Operation," filed on Feb. 9, 2022. This application also claims priority under 35 U.S.C. § 119 to Patent Cooperation Treaty App. No. PCT/CA2023/050159. The entire contents of PCT/CA2023/050159 and 63/308,363 are incorporated herein by reference.

FIELD OF THE INVENTION

The invention relates to enclosed solar parabolic reflector systems for thermal heat generation that can ultimately be used in various applications. The system includes a modular dual arch building design with a transparent building envelope and a reflector assembly supported within the building through a bearing assembly. The system is particularly suited for solar heat collection in harsh environments.

BACKGROUND OF THE INVENTION

Solar radiation provides the earth with a vast amount of incoming energy. Incoming radiation can be effectively harnessed with a wide range of technologies to convert the energy to useful forms including electrical and thermal energy.

In the case of thermal energy generation, focusing incoming solar radiation through various reflectors and/or lenses can be used to heat thermal fluids for numerous applications ranging from being used anywhere from low-grade heating to medium and high-grade heating and steam generation.

Heated thermal fluids can be used in a variety of industrial applications including simple HVAC applications to buildings/structures as well as energy sources for industrial processes such as thermoelectric energy generation or steam generation. For example, a thermal fluid such as water can be heated to varying degrees and utilized in the above applications.

Parabolic reflectors are an effective means for rapidly heating fluids. The typical parabolic reflector having a focal point enables incoming solar radiation to be focused on the focal point such that the heating effect of the incoming radiation is amplified. Depending on the design of the reflector, a fluid's temperature may be heated to a temperature that can exceed 200° C. and be as high as 500° C. By controlling flow rates through reflector systems and pressures within such systems, medium to high quality steam can be produced.

While such systems can be highly effective, deployment of parabolic reflectors has been limited in a number of ways as parabolic mirror systems are particularly susceptible to weather and are naturally affected by the day-night cycle.

For example, the effect of wind and precipitation can be particularly problematic for economic deployment and operation in many locations. Precipitation in the form of rain, hail or snow can lead to damage and/or a complete loss of performance if hail/snow impacts/covers the reflectors and/or wind causes a loss in performance due to dirt being carried onto and partially or fully-covering the reflectors. In addition, building reflector systems capable of withstanding wind and snow loads can be prohibitively expensive. With such systems, it may be required at certain times to take the systems offline and placed in a stow position to prevent damage from wind and/or precipitation and to minimize covering by particulates such as sand or dust. While these problems can be partially addressed by enclosing reflector systems within buildings having a transparent building envelope, there continues to be a need for systems that improve deployment economics including the design of modular systems that can be efficiently deployed in proximity to an end user.

Examples of past systems are described in U.S. Pat. Nos. 8,915,244, 9,322,574 and US 2013/0112394.

SUMMARY OF THE INVENTION

In accordance with the invention, there is provided a solar reflector system including: a building, the building having a plurality of structural arch pairs and a transparent membrane covering adjacent arch pairs wherein the arch pairs and membrane define a barrel vault or gothic arch roof; a thermal pipe supported in the building; at least two bearing assemblies each bearing assembly supported in the building, and having a support, each bearing assembly including a bearing race; at least one reflector assembly connected to two or more bearing assemblies and positioned at a focal distance from the thermal pipe, each reflector assembly having a parabolic reflector having a curvature with a focal point corresponding to the focal distance, each reflector assembly rotatable about each bearing assembly; and, an actuation system connected to each reflector assembly to rotate the reflector assembly within the building.

In various embodiments:

Each arch pair is a pointed barrel or gothic arch having a lower slope angle adjacent a lower outer surface edge of each arch and an upper slope angle adjacent an upper outer surface edge of each arch and where the lower slope angle between a horizontal axis and the lower outer surface edge is greater than 90 degrees and less than 110 degrees and the upper slope angle between the upper outer surface edge and the horizontal axis is greater than 40 degrees.

Each arch pair has a vertical height substantially equal to a horizontal width of the arch pair between the lower edge of the arch pair.

The transparent membrane includes membrane attachment system including a membrane track for connection to an outer surface of each arch and where the membrane track includes a membrane clamping system for attaching and sealing the membrane to the membrane track.

The membrane can be composed of ethylene tetrafluoroethylene (ETFE), polycarbonate (PC), polyethylene (PE), polyethylene terephthalate (PET), or other suitable polymers.

The membrane includes an edge bead for engagement within the membrane clamping system.

The reflector assembly includes a support frame having a plurality of parabolic members interconnected by cross members.

The actuation system includes a cable connected to opposite ends of a parabolic member and where the cable is connected to a drive motor on the building and where actuation of the motor lifts or lowers the reflector assembly relative to the thermal pipe.

The actuation system includes a central single axis geared system connected to a drive motor, wherein actuation of the drive motor rotates the thermal pipe and reflector assembly.

The support frame further includes one or more length-adjustable interconnecting frame members, and one or more connector nodes for connecting said one or more interconnecting frame members, said plurality of parabolic members and said cross members to one another.

The interconnecting frame members are rotatably connected to the one or more connector nodes such that the interconnecting frame members together with the one or more connector nodes form a frame unit that is collapsible for storage and transport and extendable for forming the support frame.

The connector node is lockable to hold interconnecting frame members is a set position and releasable to allow rotation of the interconnective frame members relative to the connector node.

The parabolic members include an attachment system for attaching a flexible reflective membrane to the support frame.

The attachment system comprises an edge bead formed along edges of the reflective membrane and tracks formed or mounted on the parabolic support members for receiving said edge bead.

A tensioning system for tensioning the reflective member to remove creases and maximize reflectiveness of the reflective membrane surface.

The tensioning system comprises one or more tensioning members on the cross members, said tensioning members being adjustable to shorten or lengthen cross members to thereby tension the flexible reflective membrane.

In another aspect, a bearing assembly is described having: a stationary portion and a pivoting portion supporting a thermal pipe; the stationary portion having two support plates and at least two bearing stay connectors; the pivoting portion including a bearing race having an inner race connected between the support plates for engagement against the thermal pipe, and an outer race having a reflector assembly connector wherein the reflector assembly connector can rotate relative to the thermal pipe.

In various embodiments:

The two support plates are separated by a gap enabling two thermal pipe sections to be welded together when the pipe sections ends are positioned between the support plates.

Each support plate includes two half sections for engagement with each other and the bearing stay connectors.

Each of the inner race and outer race include two half sections enabling installation of the pivoting portion over the thermal pipe after the thermal pipe has been installed within the stationary portion.

In another aspect, a modular solar reflector system is described, having: at least two arches where each arch are connectable to form a structural arch pair defining a pointed barrel vault or gothic arch; and, at least one bearing assembly for connection to the pointed barrel vault arch, the bearing assembly having a support plate for supporting a thermal pipe and a bearing race configured for support by the thermal pipe and configured for rotation about the thermal pipe.

In various embodiments:

The reflector assembly is configured for attachment to at least two bearing assemblies at a focal point distance, each reflector assembly having a parabolic reflector having a curvature with a focal point corresponding to the focal point distance.

The system includes a membrane attachment system wherein the membrane attachment system includes a membrane track for connection to an outer surface of each arch and where the membrane track includes a membrane clamping system for attaching and sealing a membrane to the track.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 1 shows two perspective overviews of a solar thermal energy conversion (STEC) system showing a typical modular deployment in accordance with one grade-mounted embodiment of the invention.

FIG. 2 is an isometric view of a solar receiver support and collector rotation bearing system of an STEC system in accordance with one embodiment of the invention.

FIG. 5B is a bottom perspective view of the reflector system of FIG. 5A.

FIG. 5C is a side elevation view of the reflector system of FIG. 5A.

FIG. 6G is a partial elevation view of the reflector system of FIG. 6A, showing a rotatable pipe connection.

FIG. 8A is a perspective view of a connector node.

FIG. 8C is a side elevation view of the connector node of FIG. 8A.

FIG. 8D is a perspective view of frame members and connector nodes in an extended position.

DETAILED DESCRIPTION OF THE INVENTION

Figure 1A:
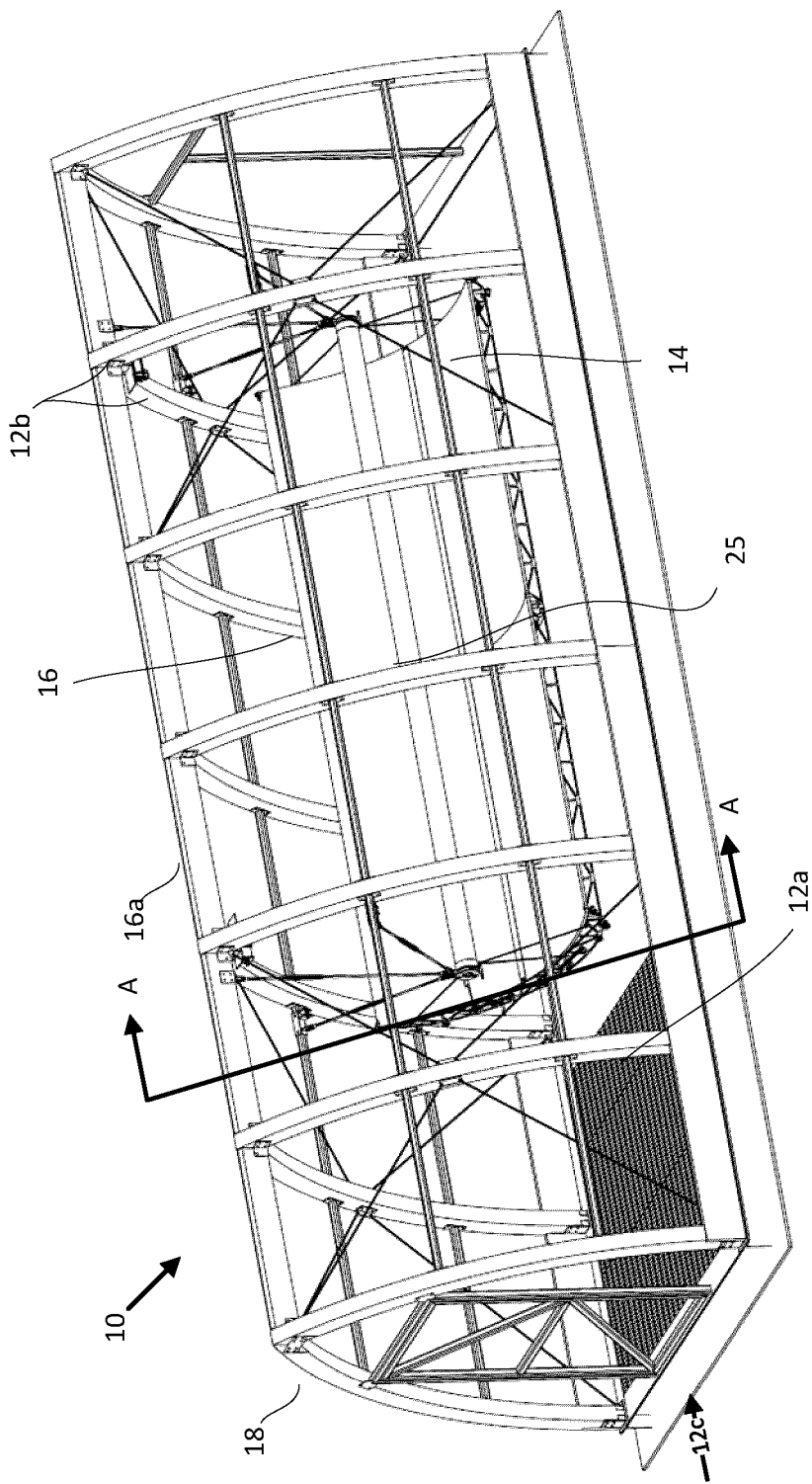
FIG. 1A is an isometric view of an STEC system in accordance with one embodiment of the invention.

With reference to the figures solar thermal energy conversion (STEC) systems 10 are described.

All terms have definitions that are reasonably inferable from the drawings and description.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

With reference to the Figures, an STEC system 10 is described. The system 10 includes an arched building structure 12 enclosing a parabolic solar collector assembly (PSCA) (also referred to herein as a solar receiver and collector assembly or reflector assembly) 14. The arched building structure includes pairs of arches 12a connected together to form dual arch assemblies 12b. A plurality of dual arch assemblies is aligned and spaced along a central axis 12c to form supports for an external building envelope 23 (FIG. 1E) and the reflector assembly 14. Deployment of an STEC system 10 can be used for the generation of medium to high quality heating fluids including steam from solar radiation.

Building Structure

With reference to FIGS. 1A-1F, each arch 12a, when assembled forms a dual arch assembly 12b, designed to provide a shape and structure that both protects the reflector assembly from weather elements and support the reflector assembly 14 within the building envelope.

As shown, aligned pairs of arches form a barrel vault or gothic arch structure and preferably a pointed barrel vault or gothic arch characterized by arches having a substantially vertical exterior surface adjacent a lower end 12d transitioning to an approximately 45° exterior surface adjacent an upper end 12e.

In various embodiments, the lower slope angle between a horizontal axis and the lower outer end surface 12d is 90 degrees or greater, preferably between about 90 degrees and 110 degrees, and more preferably between about 90 degrees and 100 degrees, and the upper slope angle between the outer upper end surface 12e and a horizontal axis is greater than 40 degrees, preferably between about 40-60 degrees and most preferably about 45 degrees.

As such, the dual arch shape provides a high-slope upper outer envelope surface that progressively increases to a substantially vertical surface towards the lower end. This structure substantially prevents/minimizes the accumulation of snow/water on the envelope with angles that will generally prevent or minimize environmental solids, such as dust, sand and/or accumulating snow accumulating on the envelope.

Optionally, the building structure 12 can include one or more peripheral, external drainage channels to direct collected water from rain and snow, said water which in turn can be directed to an integrated reservoir or drainage system. The drainage channels can be formed into the arches 12a themselves, or can be formed by means of texturing of the envelope material, or the drainage channels can be separate channels mounted to one or both of the arches 12a or the envelope material.

The symmetric dual arch structure also provides a modular design wherein any reasonable number of arch pairs can be assembled along an axis to create STEC systems of varying lengths and system capacity. These repeating assembly units enable both efficient manufacturing and construction at a deployment site.

As shown, each arch pair 12b are inter-connected by a top gusset 13 and may be connected to a foundation structure 15 via bottom gussets 13a. A typical arch pair ranges in base width from about 3 m to 9 m and total height of about 3 m to 9 m maintaining a 1:1 ratio.

As shown in FIG. 1A, adjacent arch pairs 12b are interconnected via a ridge member 16a at the apex of each arch pair. Horizontal stringers 16 spaced between each arch provide additional attachment points for envelope material and the reflector assembly. Spacing between arch pairs is variable and will consider the span of the envelope material described below to enable proper snow/wind loading while also seeking to minimize shadowing effects from the arch pairs over the reflector assembly 14 (typically 3-9 m centers or 4.5-6 m).

Suitable arch materials include pre-formed metal arches and laminated wooden arches, however any other suitable material, including plastics, could be used which can be formed to the desired shape and angle of the arches 12a, which is suitably weather-resistant, and which can either be formed with a means to support the envelope, or onto which can be mounted means to support the envelope. Such means can include a Keder-style track system or other systems, as described further below.

Figure 1B:
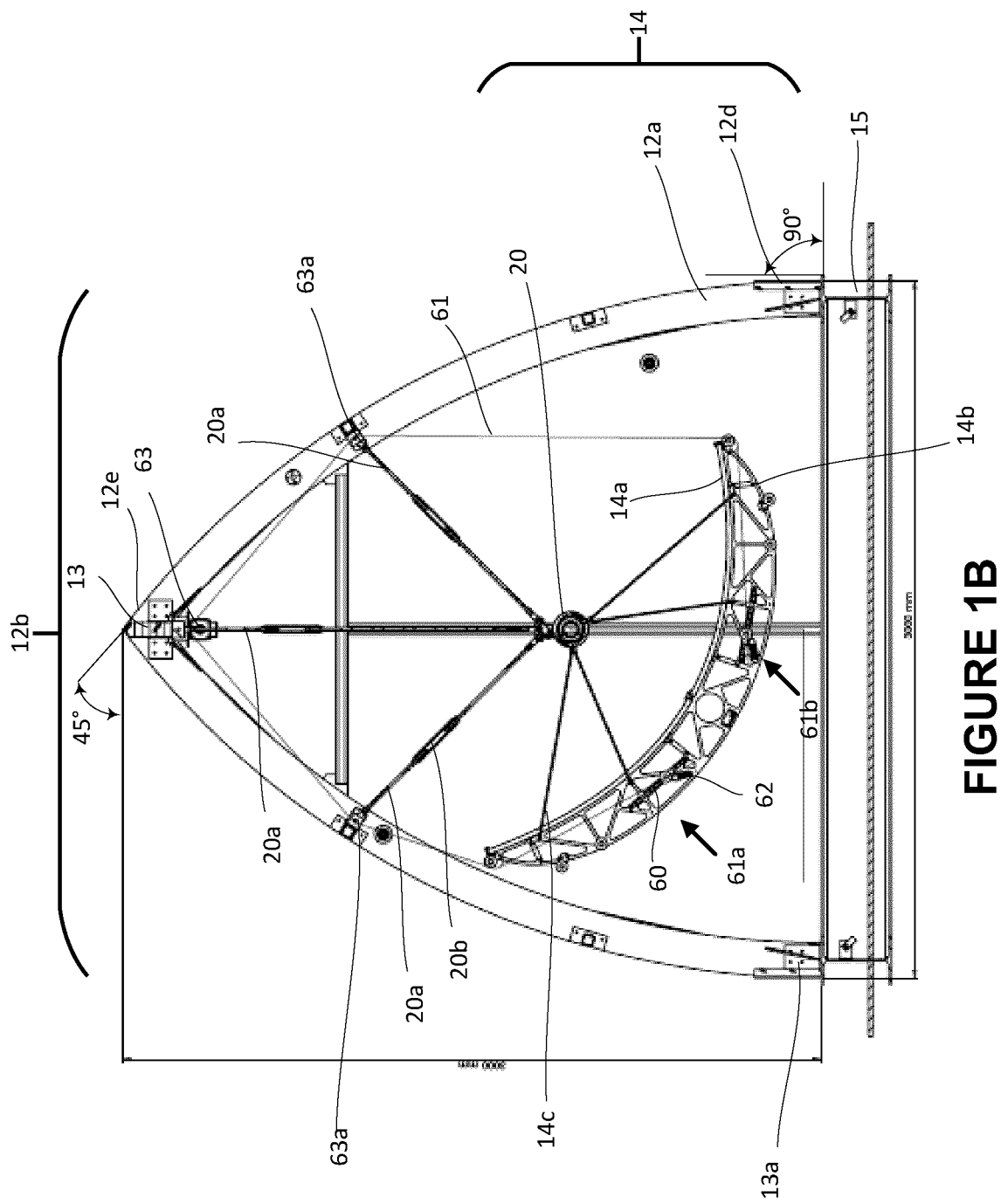
FIG. 1B is a cross sectional view of an STEC system at line A-A from FIGS. 1A and 10 in accordance with one embodiment of the invention.
Figure 1C:
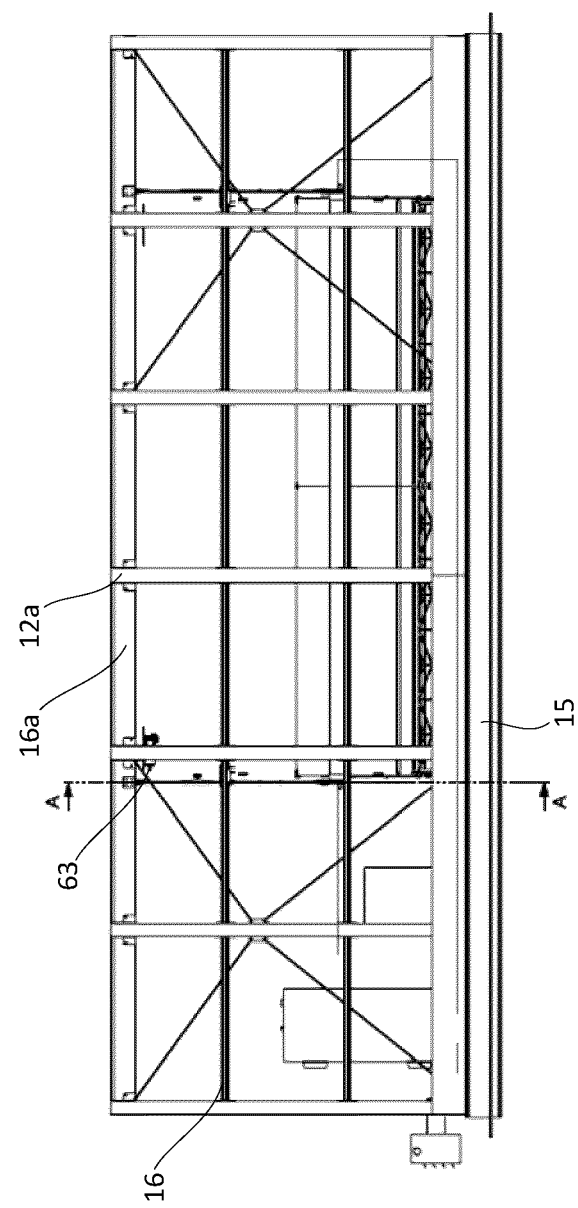
FIG. 1C is a side view of an STEC system in accordance with one embodiment of the invention.
Figure 1D:
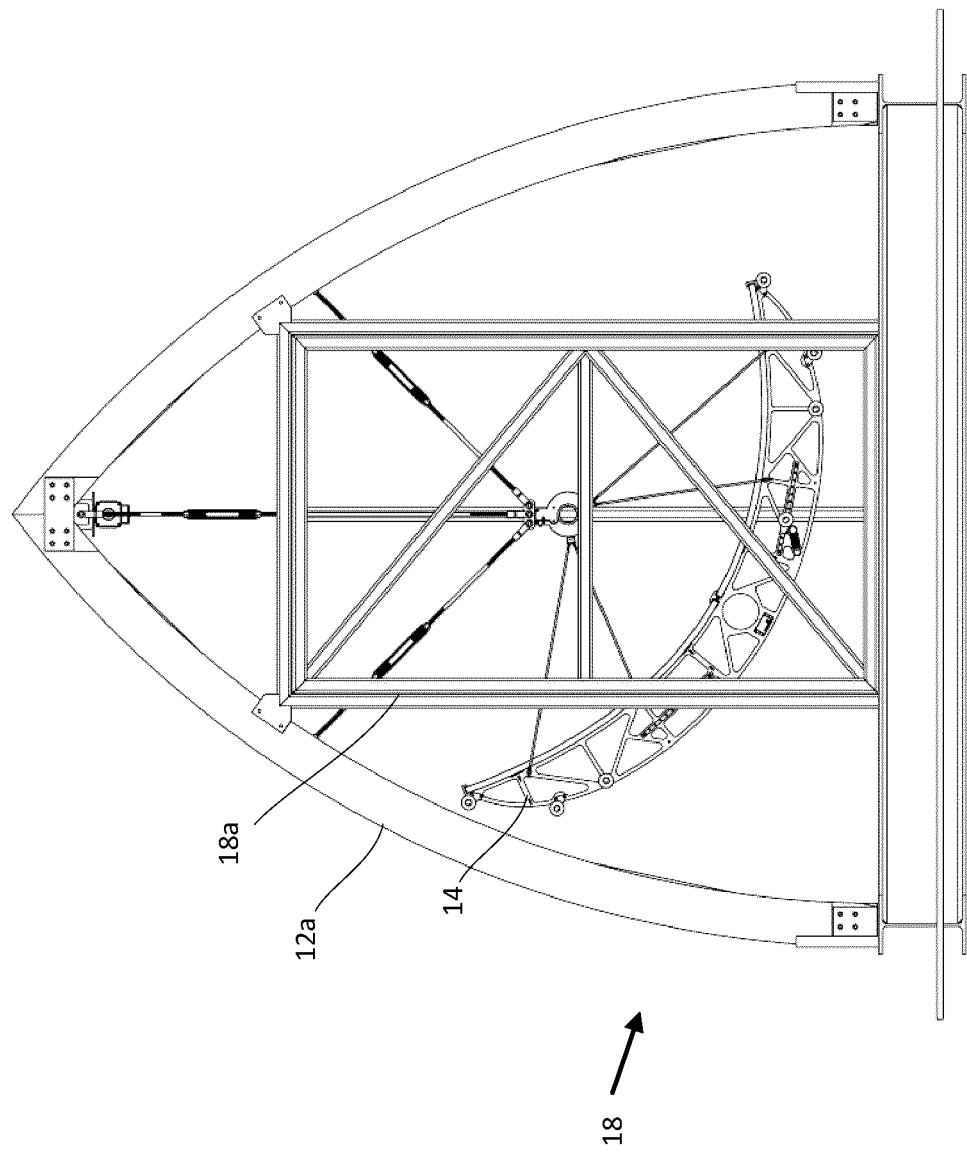
FIG. 1D is an end view of an STEC system in accordance with one embodiment of the invention.

The building includes appropriate access doors 18a constructed in end walls 18 as shown in FIG. 1D.

The foundation 15 of the building may be constructed as required by local building codes and may include fully excavated and supported concrete structures, screw piles, and floating on grade foundations as may be appropriate for a particular location and size of building.

Figure 9:
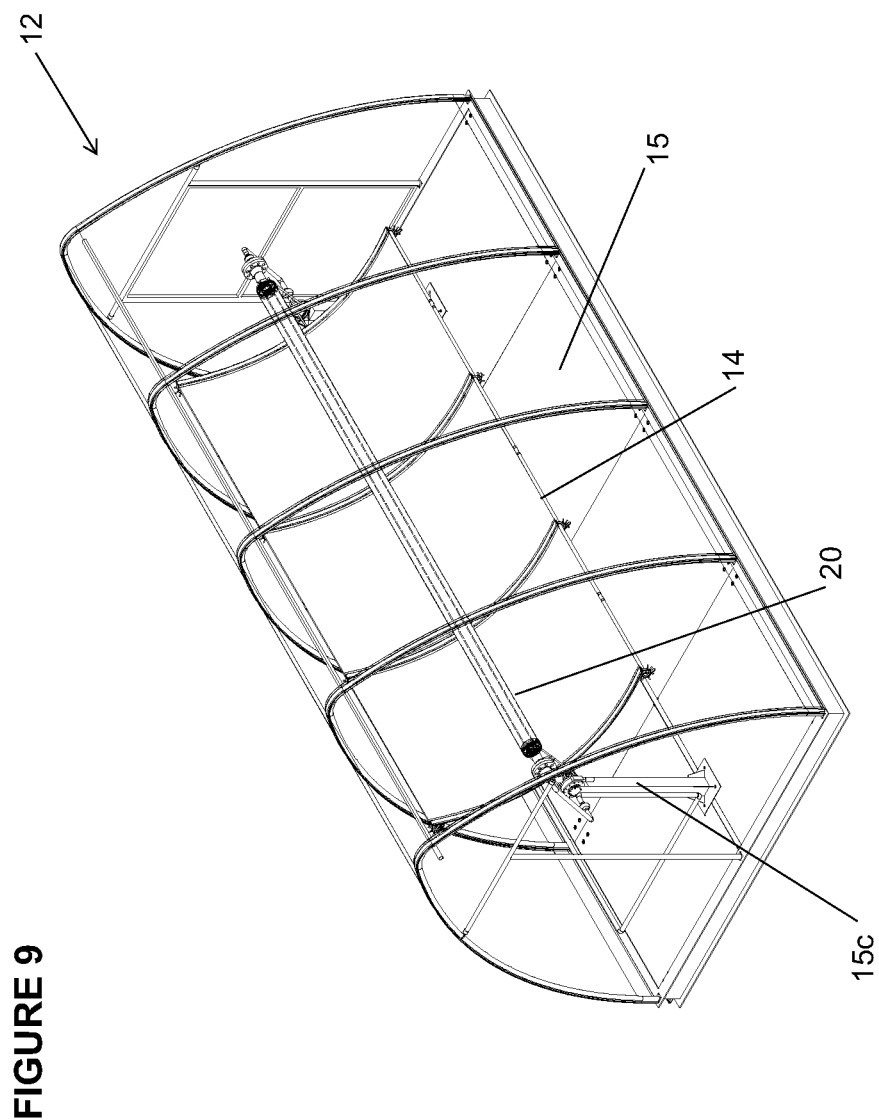
FIG. 9 is a perspective view of a further embodiment of a solar reflector system.
Figure 9A:
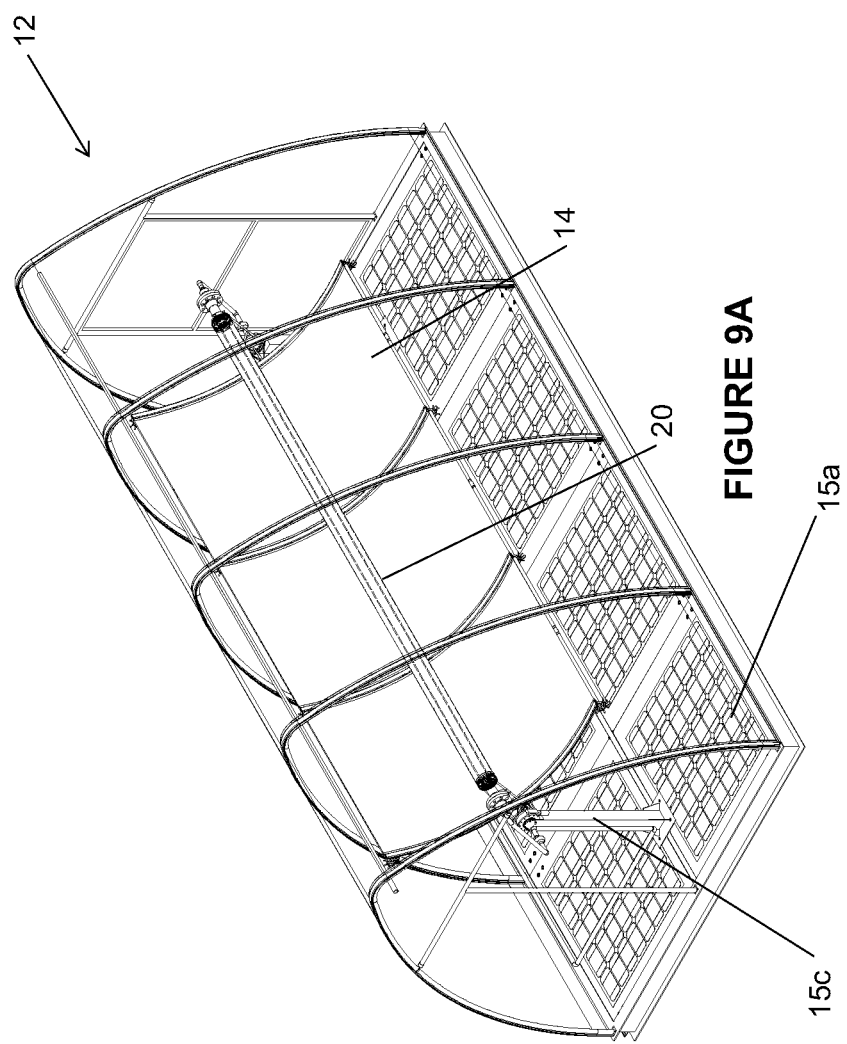
FIG. 9A is a perspective view of a further embodiment of a solar reflector system.
Figure 10A:
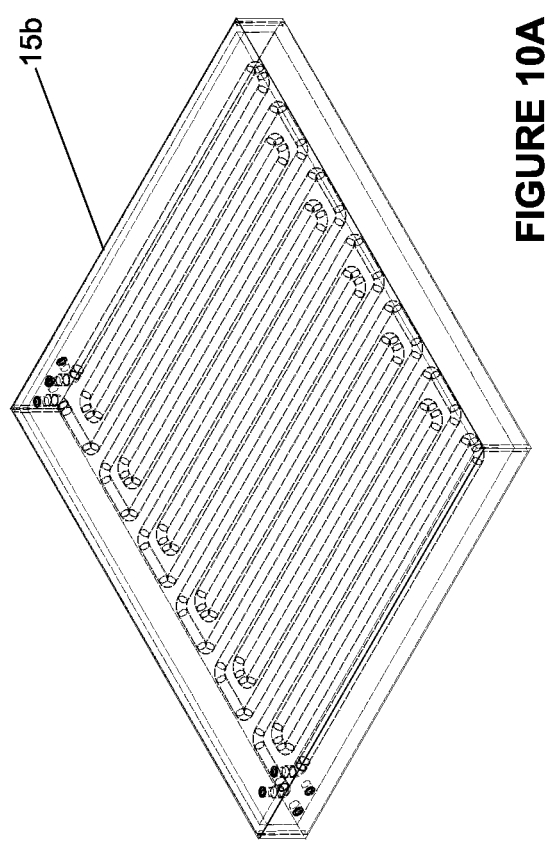
FIG. 10A is a perspective view of a first embodiment of a floor panel.
Figure 10B:
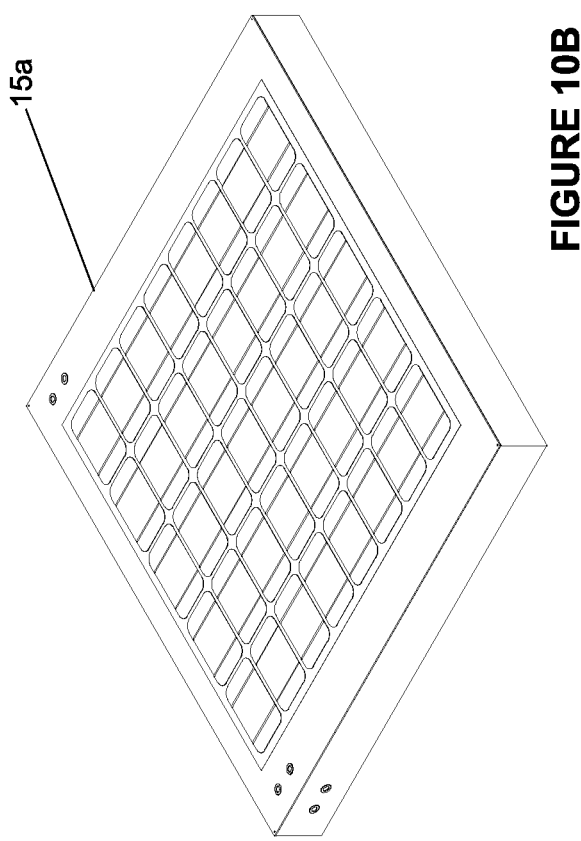
FIG. 10B is a perspective view of a second embodiment of a floor panel.

In a further alternate embodiment illustrated in FIGS. 9A and 10B, the support base 15 may be built to include photovoltaic (PV) panels 15a that can be energized from solar power such that the system 10 forms a hybrid PV and thermal system.

Figure 9B:
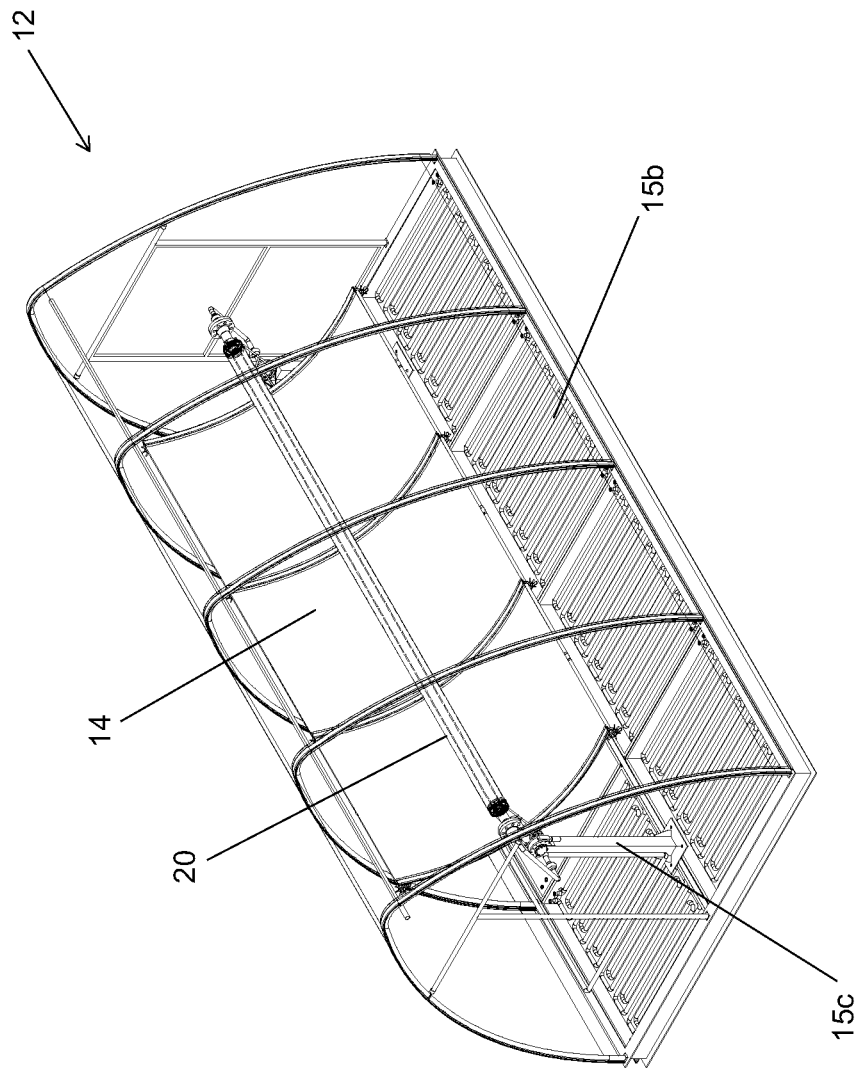
FIG. 9B is a perspective view of a further embodiment of a solar reflector system.
Figure 9C:
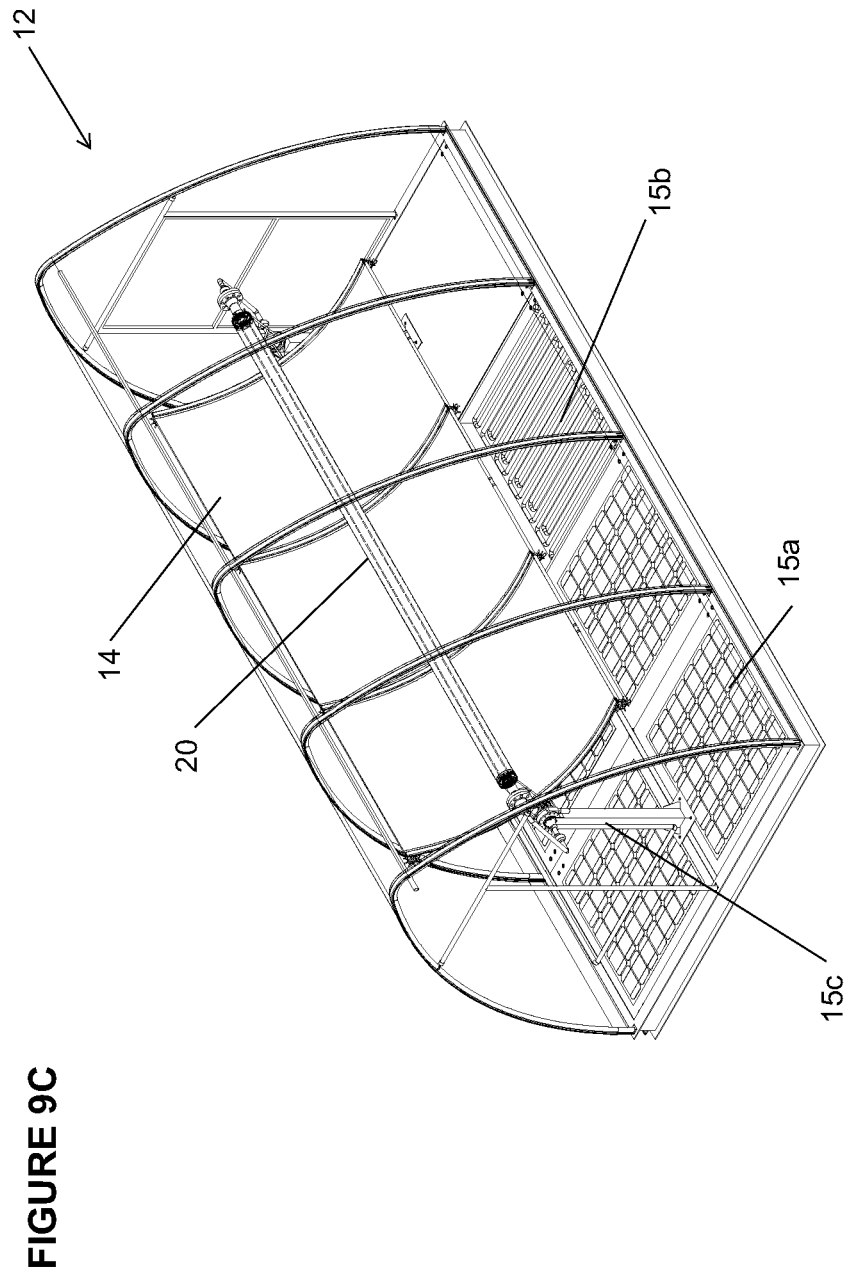
FIG. 9C is a perspective view of a further embodiment of a solar reflector system.

In other embodiments as illustrated in FIGS. 9B and 10A, the support base may include one or more panels that serves as a modular thermal energy storage system 15b, in which thermal fluids are directed to run in floor panels of the support base containing a thermal mass or phase change material (PCM) capable of charging or discharging heat energy from/to the thermal fluid. In one example, for rapid system start-up or stabilized energy delivery, thermal fluids may be partially pre-heated by directing passage through the thermal energy storage system, having stored heat produced the previous day through a reverse process, prior to introduction to the main heating system as described below.

Figure 10C:
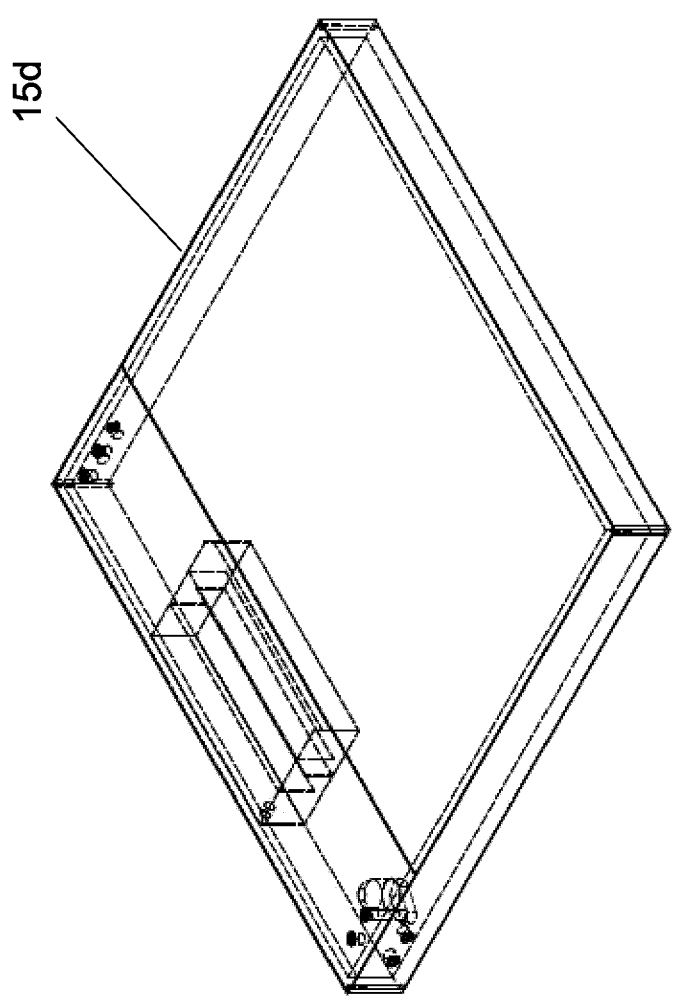
FIG. 10C is a perspective view of a third embodiment of a floor panel.

The foundation/flooring system may also include one or more panels that serve as a reservoir 15d for liquids collected by the external drainage system described above. Such reservoir panels are illustrated in FIG. 10C.

It would be understood by a person of skill in the art that the foundation/flooring system can include of any combination of PV panels 15a, thermal energy storage panels 15b or reservoir panels 15d or plain panels.

In another embodiment for scaled system configuration and design, the thermal energy storage system is stacked in a separate structure.

Figure 1E:
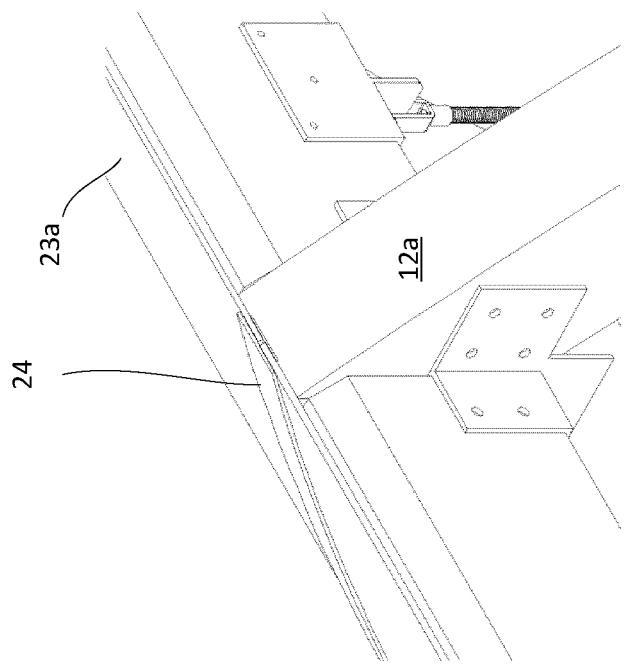
FIGS. 1E and 1F are perspective views showing details of a membrane attachment system in accordance with two embodiments of the invention.

As shown in FIG. 1E, the outer surface of the structure (i.e. the building envelope) is a material 23 that is transparent or substantially transparent to solar radiation. That is, the envelope material is selected to maximize solar radiation into the building whilst providing sufficient structural properties for sealing the building to water and to provide sufficient wind and snow loading. The surface properties of the envelope may also be provided with low friction properties to further assist in snow shedding.

Suitable envelope materials include a tensioned membrane such as ethylene tetrafluoroethylene (ETFE), polycarbonate (PC), polyethylene (PE), polyethylene terephthalate (PET), or other suitable polymers that are configured to be held and received in Keder-type extrusion tracks 22 mounted on and connected to the arches 12a. The membrane material 23 is provided with an edge bead 22b that is held within an appropriate recess in the track 22a to provide support and tension to the membrane 23 between arches of the building.

Figure 1F:
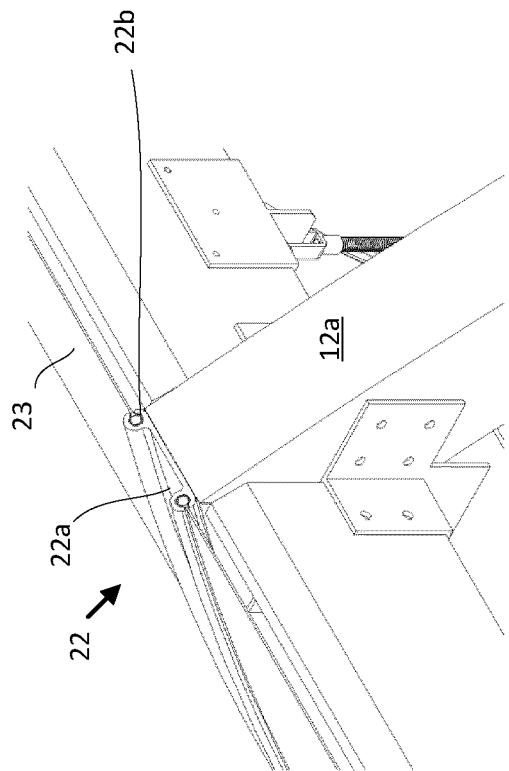

Other envelope materials include acrylic, PVC, polycarbonate or other suitably transparent materials 23a that may be attached to the exterior of the building with slotted tracks 24 as shown in FIG. 1F.

Tensioned membranes such as ETFE are advantaged over various transparent materials by providing a balance between optical, thermal, and physical properties. ETFE is more transparent to solar radiation while remaining lightweight with excellent abrasion resistance, thermal and UV stability, and good tear/puncture resistance compared to other materials. A comparison to other materials shows that ETFE can have a transmissivity of up to 94% compared to polycarbonate which has a transmissivity up to 90% and polyethylene which has a transmissivity up to 83%.

Parabolic Solar Collector Assembly (PSCA)/Reflector Assembly

As shown in FIG. 1B, in one embodiment the building arches 12b support the parabolic solar collector assembly (PSCA)/reflector assembly 14 within the building. The reflector assembly 14 includes a parabolic reflector 14a having a support frame 14b. The reflector 14a and support frame 14b are supported by rigid reflector stays 14c and bearing assembly 20. Bearing assembly 20 is suspended and supported from the building frame by rigid bearing stays 20a. As shown, the reflector stays 14c are configured to multiple connection points on the support frame 14b to provide support and rigidity to the reflector and support frame as it is rotating as described below. The bearing stays 20a are preferably connected to three or more separate positions on an arch pair including the apex and an upper side surface of each arch. As shown, the bearing stays may include rigging screws/turnbuckles 20b to enable system adjustment during assembly and if required during maintenance.

In an alternate embodiment as illustrated in FIGS. 6A to 6G and 9 to 9C, the thermal pipe 25 is connected to the reflector assembly 14 by means of rigid supports 25c connected between thermal pipe 25 ends and ends of the reflector assembly 14. The rigid supports 25c are in turn connected by a support post 15c that is fixed to the foundation 15 of the building. In this embodiment no relative rotation is allowed between the thermal pipe 25 and the reflector assembly 14. Instead, the thermal pipe 25 and the reflector assembly 14 are rigidly connected to one another such that both rotate together along a common axis of rotation, said common axis of rotation including the bearing assemblies 20, as will be described in further detail below.

The parabolic reflector 14a and support frame 14b are designed to be relatively light weight to reduce material costs, manufacturing costs, operating costs, the physical size and density of support materials and reflector tracking system, and energy demand of the reflector tracking control system. The reflector and frame assembly must be sufficiently rigid to enable accurate operation and movement of the assembly within the building, but it is not required to withstand hail, wind and snow loads.

The reflector may be constructed of a combined reflector (e.g. silver reflective film), honeycomb support (e.g. expanded aluminum honeycomb cell) and a backing (e.g. a thin aluminum panel). Other lightweight reflectors may also be utilized.

Figure 4:
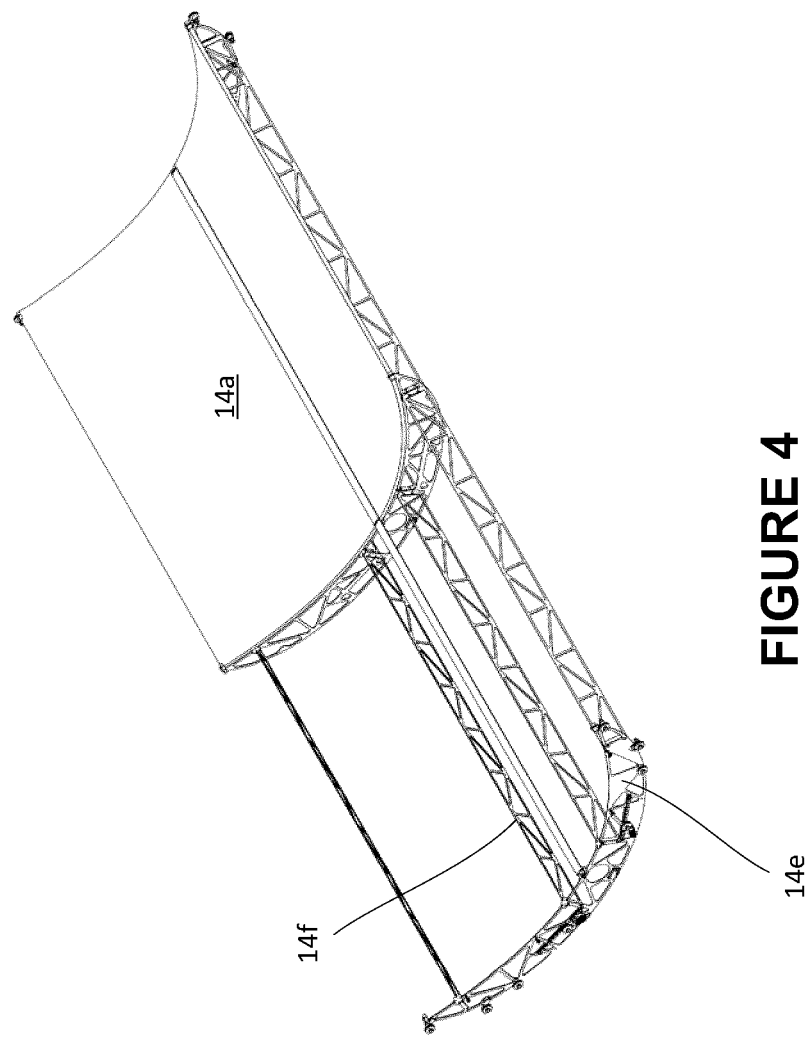
FIG. 4 is an isometric view of a first embodiment of a reflector system of an STEC system showing a reflector space frame with a partially installed reflector in accordance with one embodiment of the invention.

As shown in FIG. 4, the frame assembly 14b includes parabolic support members 14e and cross-members 14f to interconnect each parabolic support member 14e. Collectively, the parabolic reflector 14a and frame assembly 14b are designed to provide sufficient rigidity whilst minimizing weight. The frame assembly can be manufactured from lightweight steel/aluminum/plastic in the form of structural trusses. The reflector stays 14c are connected to the frame assembly at their lower end.

In an alternate embodiment illustrated in FIGS. 5A to 6G, the reflector assembly 14 includes a parabolic reflector having a reflective surface configured to underlying support members 14e (FIG. 7B), cross members 14f and a deployable space frame assembly 14b that collectively provide a rigid and lightweight parabolic structure. As shown for example in FIG. 5B, the frame assembly includes a plurality of rods 14g interconnected through nodes 80 (FIG. 8A, 8B, 8C) that lock individual rods at various angles with respect to one another to create a lightweight frame structure supporting the reflective surface.

Figure 8B:
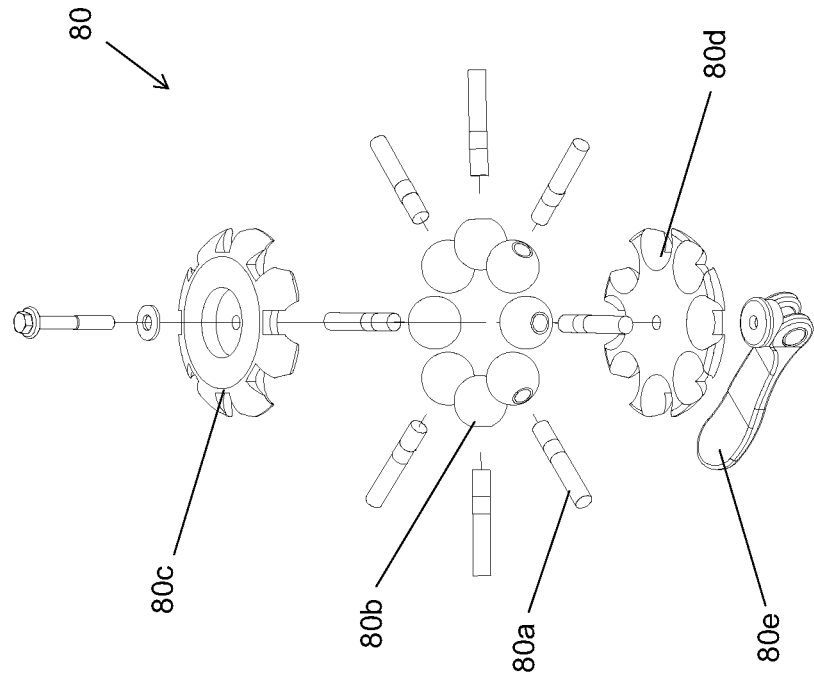
FIG. 8B is an exploded perspective view of the connector node of FIG. 8A.

As illustrated in FIGS. 8A to 8C, the rods 14g are connectable by use of one or more node connectors 80. The node connector 80 can receive a plurality of connector pegs 80a configured to an end of each of the members/rods 14e, 14f, 14g. The pegs 80a may be threaded to be received into mating threads inside the ends of the support members or vice versa.

The pegs 80a are rotatable/pivotable in the node connector 80 via a ball 80b that engages within the node connector and allows for rotation/pivoting of the peg 80a within the node. The movement between the ball and node connectors in turn allows for the support members to extend at a variety of angles and orientations to facilitate connection, orientation and tensioning between the various support members. The balls 80b are sandwiched between clamshell halves 80c/80d of the node connector 80 such that the balls 80b can rotate/pivot while being held securely. A clamping handle 80e clamps clamshell halves 80c/80d together once the orientations of the pegs 80a and support members are set, to thereafter prevent movement of the balls 80b within the connector node 80.

Figure 5A:
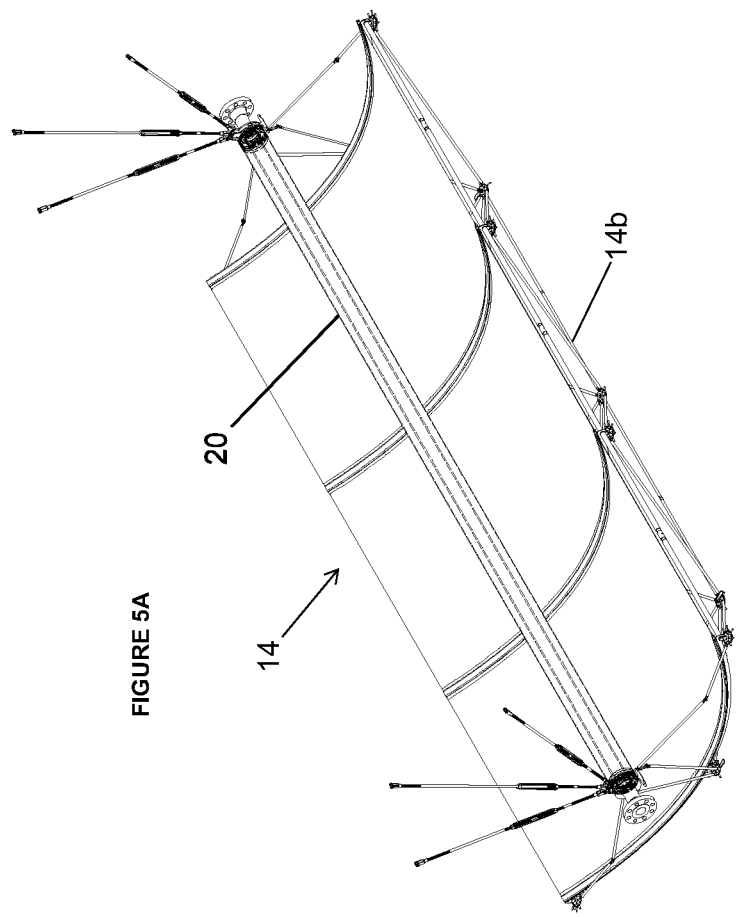
FIG. 5A is a top perspective view of a second embodiment of a reflector system, showing a bearing system and thermal receiver pipe of a STEC system.
Figure 5D:
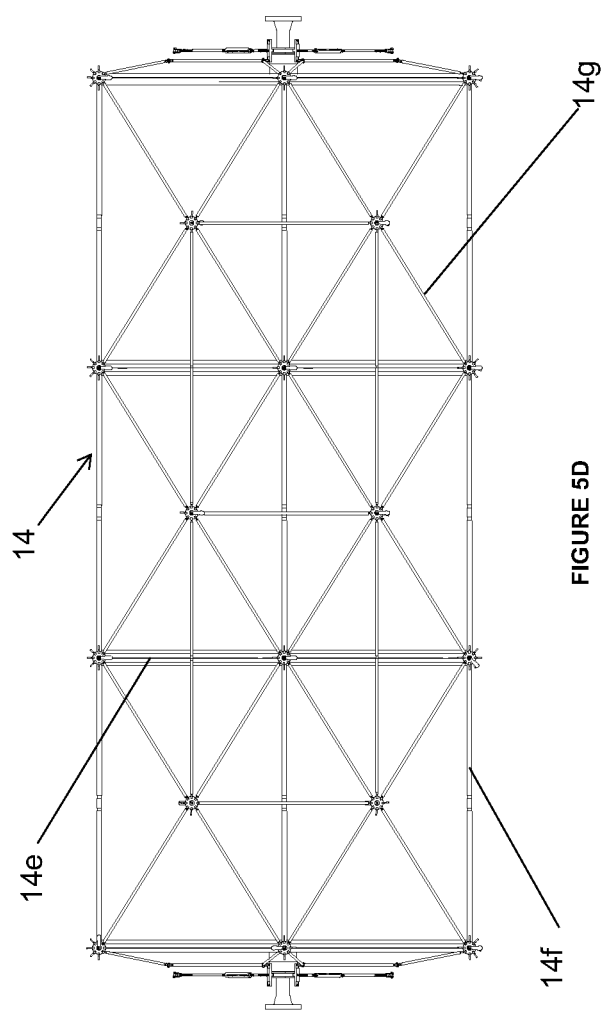
FIG. 5D is a bottom plan view of the reflector system of FIG. 5A.
Figure 5E:
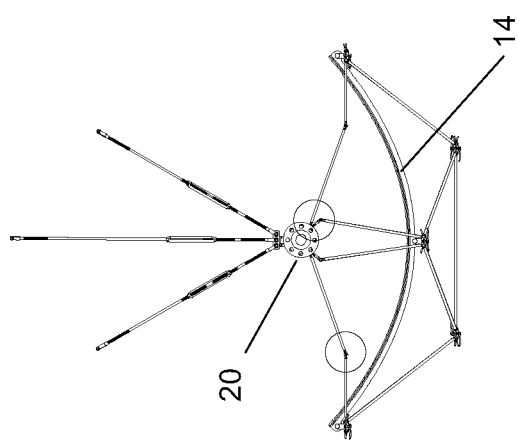
FIG. 5E is an end elevation view of the reflector system of FIG. 5A.
Figure 5F:
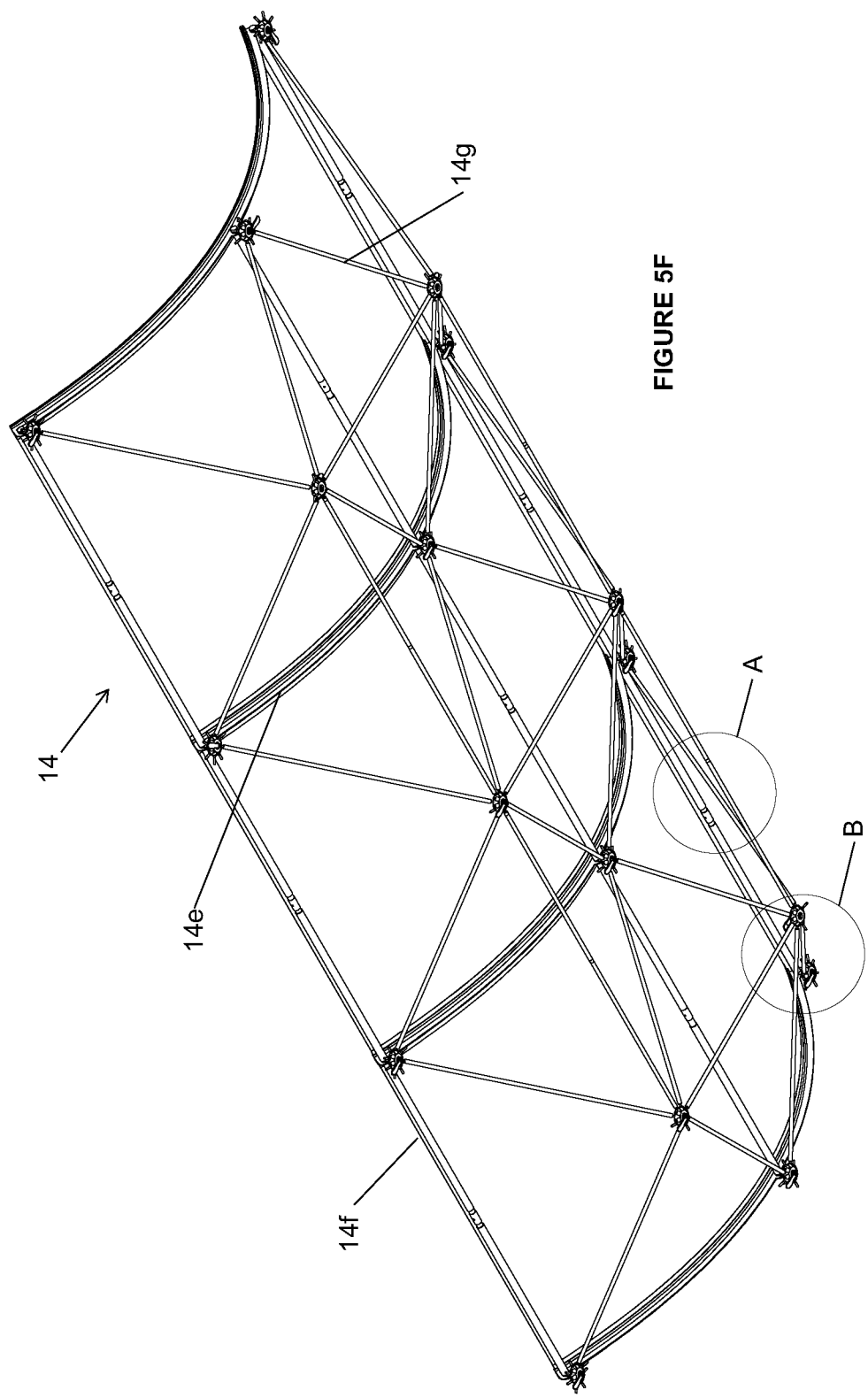
FIG. 5F is bottom perspective view of the reflector system of FIG. 5A.
Figure 5G:
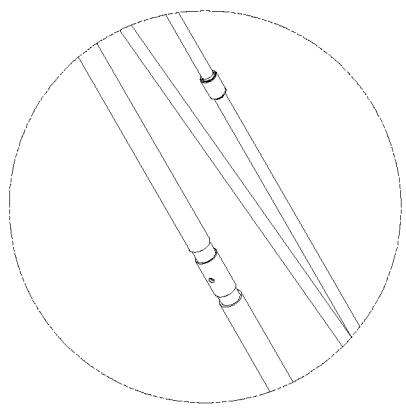
FIG. 5G is a detailed view of section A of FIG. 5F.

The support members/rods 14g of FIG. 5G are preferably configured such that the length of a member/rod can be extended or shortened. This can include being interconnectable via end-to-end connectors such that multiple support members/rods can be connected to achieve a desired overall length of support member for supporting the reflector 14a. Further, a threaded connector 14j can be used to connect threaded ends of the support members such that the threaded connector 14j can be rotated to extend or contract the length of a support member/rod to provide appropriate tensioning of the overall support frame and/or for desired adjustment of the length of a member/rod.

Figure 8E:
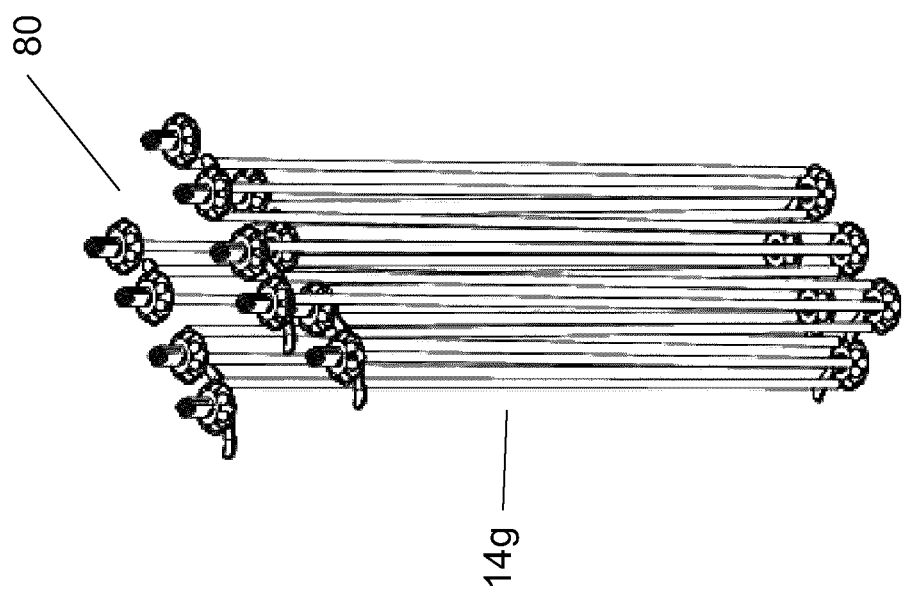
FIG. 8E is a perspective view of frame members and connector nodes in a collapsed position.

Furthermore, as illustrated in FIGS. 8D and 8E, the rotatable connection between frame members and the node connector 80 allows for the overall space frame structure to be collapsed and reduced in size for transport to site, where the space frame can again be extended and arranged for supporting a reflective membrane 14a, all without having to disconnect support members from the nodes 80. This forms a prefabricated frame that simplifies the transportation process to the extent that each frame may be collapsed for shipping reducing shipping volume and greatly speeds up the set up and take down process.

Figure 5H:
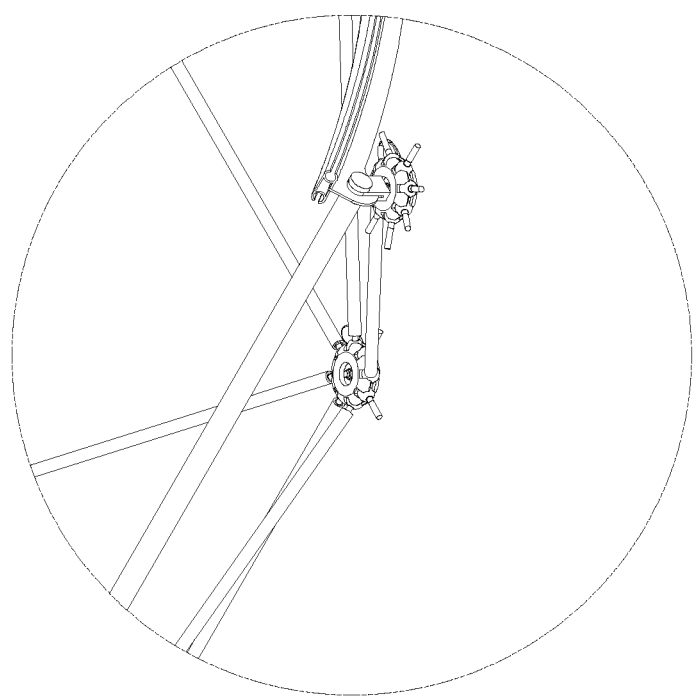
FIG. 5H is a detailed view of section B of FIG. 5F.

As shown in FIG. 5H cross members 14f are connected to parabolic members 70b to provide a fixed spacing between adjacent parabolic members wherein the configured rods 14g lengthened/tensioned via the threaded connectors and nodes to provide tensioning to overall support frame and reflector.

In one embodiment, as illustrated in FIGS. 7A to 7D, the parabolic members 14e also include an attachment and tensioning system 70 for attaching a flexible reflective membrane 14a to the parabolic members 14e. In this embodiment, the reflective membrane includes an edge bead 70a to interface with tracks 70b formed with or mounted on the parabolic support members 14e. Thus, a reflective surface, which may be somewhat flexible and having a bead 70a along opposite edges, may be inserted into tracks 70b and then tensioned by adjustment of the support frame members as described above.

Bearing Assembly

Figure 2A:
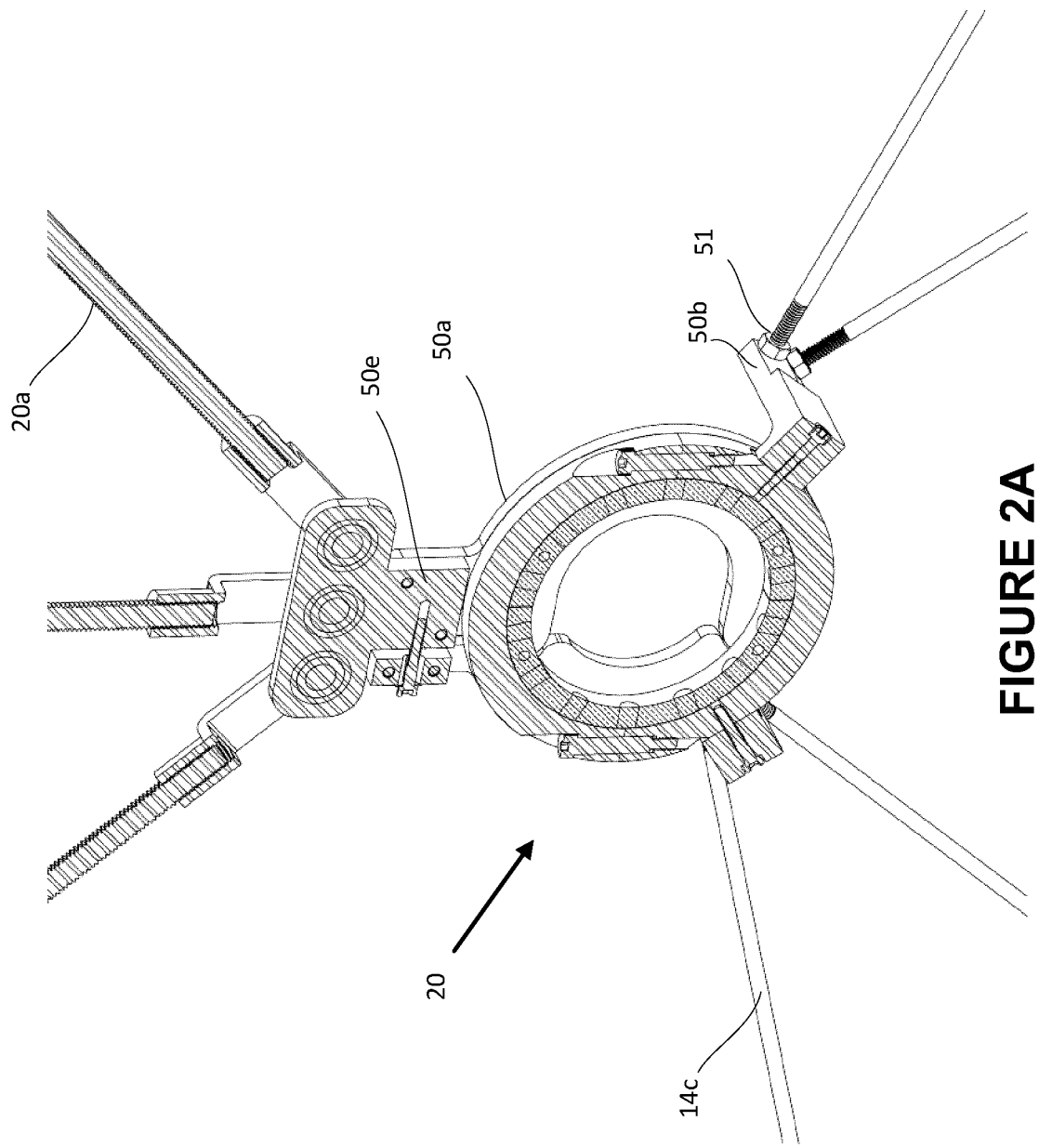
FIG. 2A is an isometric cross-sectional view of a solar receiver support and collector rotation bearing system of an STEC system in accordance with one embodiment of the invention.
Figure 2B:
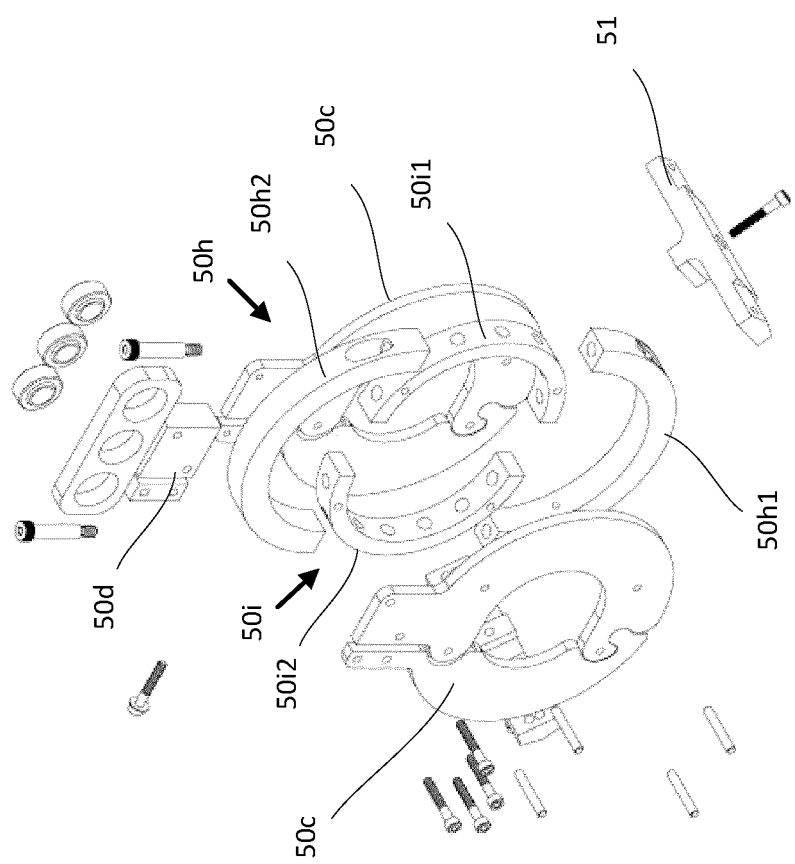
FIG. 2B is an exploded view of a solar receiver support and collector rotation bearing system of an STEC system in accordance with one embodiment of the invention.
Figure 3:
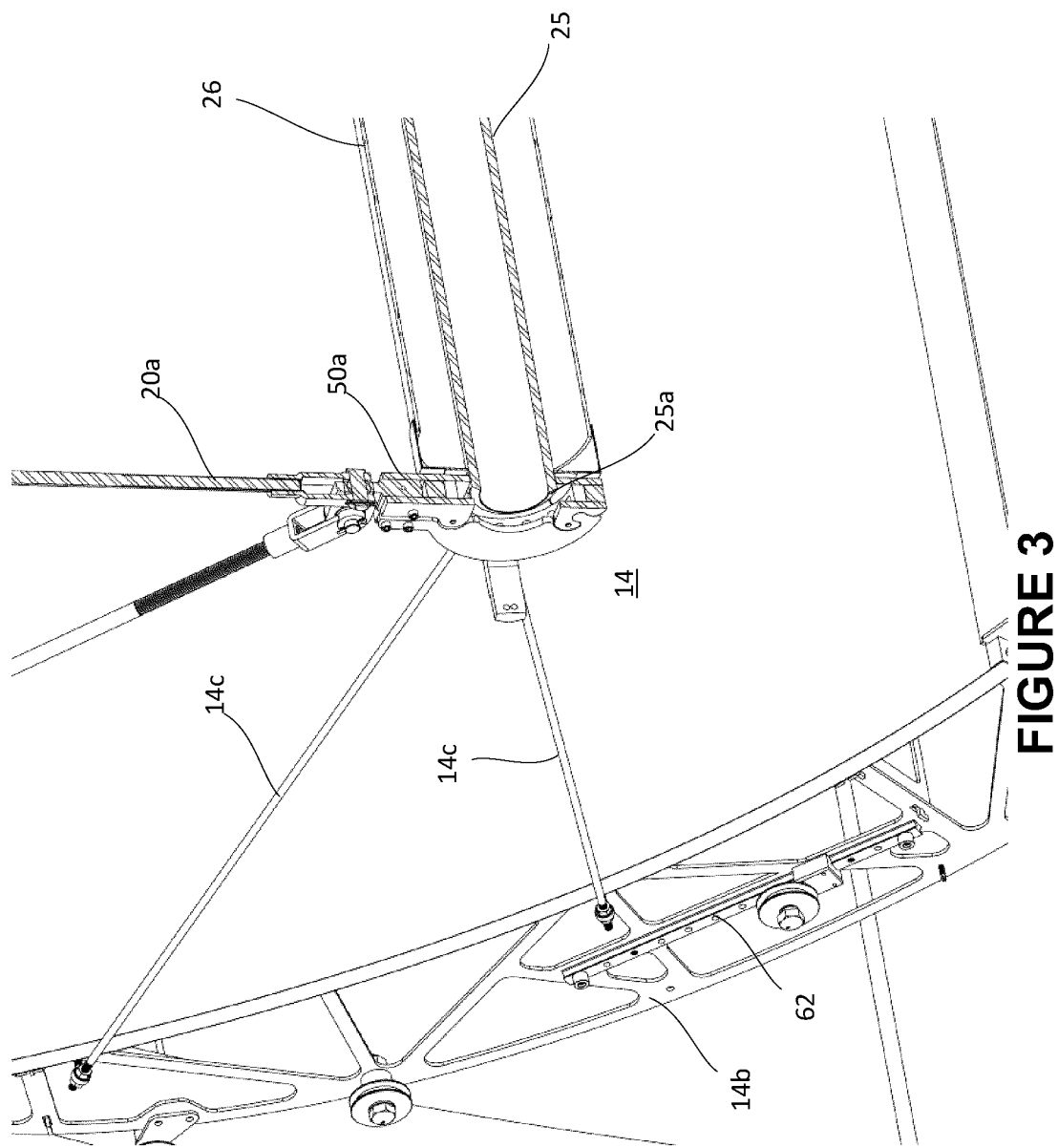
FIG. 3 is an isometric and cross-sectional view of a solar receiver support and collector rotation bearing system and thermal receiver pipe of an STEC system in accordance with one embodiment of the invention.
Figure 3A:
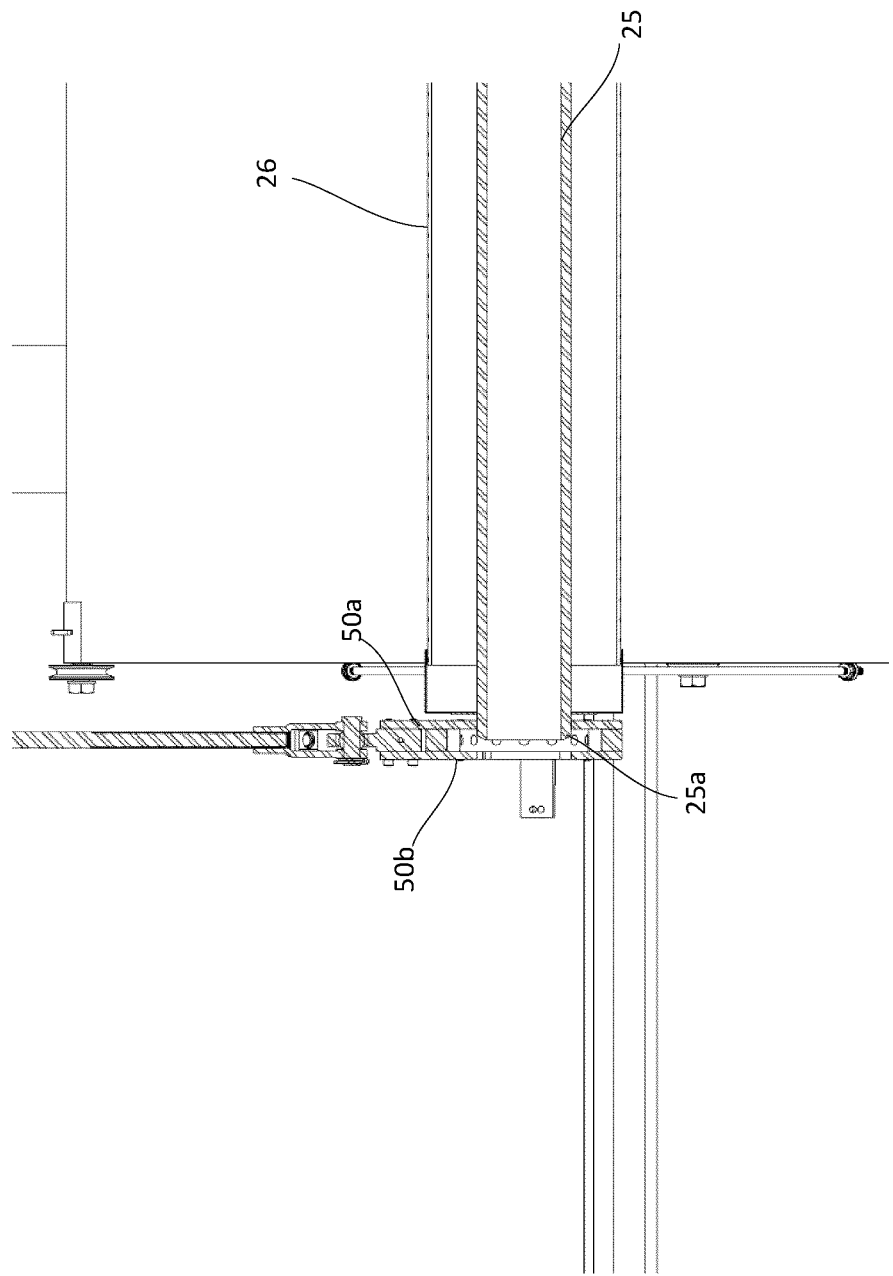
FIG. 3A is a side and cross-sectional view of a bearing system and thermal receiver pipe of an STEC system in accordance with one embodiment of the invention.

As shown in FIGS. 1 to 5F, the STEC system is designed to heat a thermal fluid within a solar thermal pipe 25, specifically designed for solar thermal heating, positioned at the focal point of the reflector system. The efficiency of the thermal pipe can be aided by coating the pipe in an absorptive coating and enclosing the pipe in an evacuated glass cylinder 26. FIGS. 3 and 3A shows a section of the parabolic reflector system and a corresponding section of thermal pipe 25. In one embodiment, as shown in FIG. 1, the thermal pipe is fixed relative to the building structure, or alternatively as shown in FIG. 6A to 6G and FIGS. 9 to 9C, the thermal pipe 25 is connected to the building foundation 15, allowing thermal fluid to flow from one end of the building to another.

In order to enable the reflector assembly 14 to focus on the thermal pipe 25, In the embodiments of FIGS. 1 to 5F, the bearing assemblies 20 both support the thermal pipe in its fixed position whilst allowing the reflector assembly to be rotated about the thermal pipe. In FIGS. 6A to 6G and FIGS. 9 to 9C, the bearing assemblies 20 support the thermal pipe 25 together with the reflector assembly 14, whilst allowing rotation about the central bearing axis.

Figure 3B:
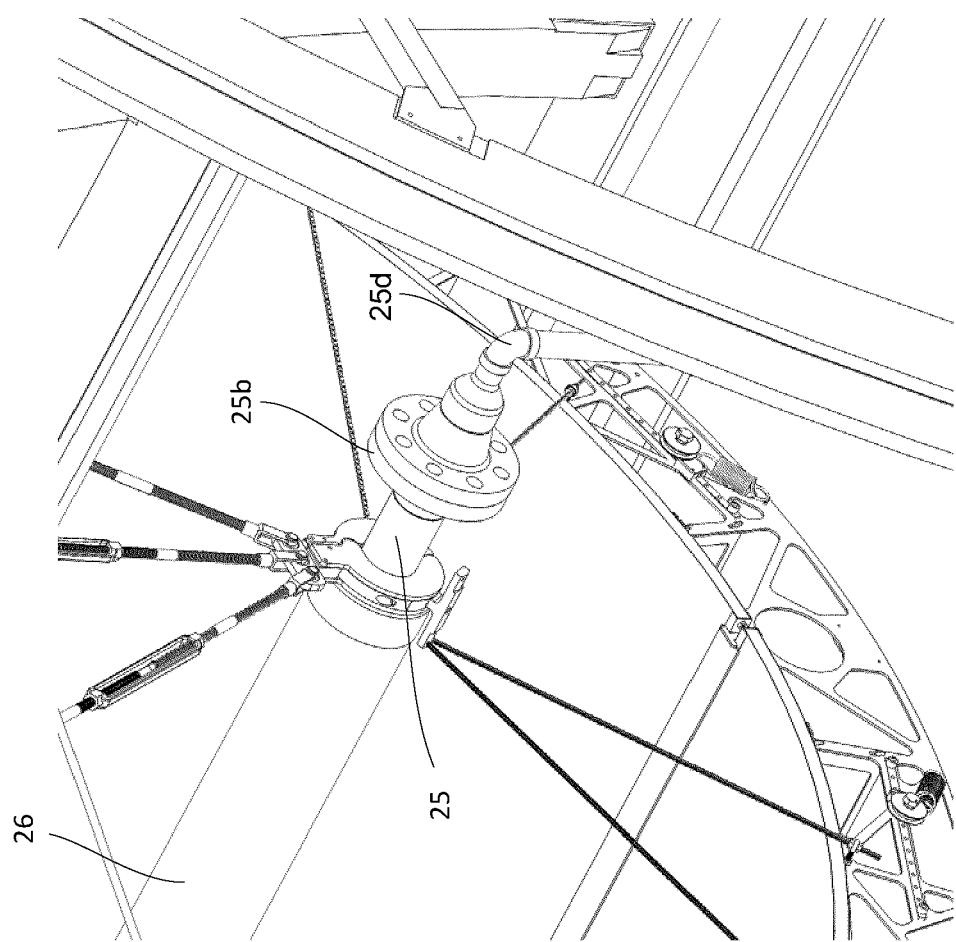
FIG. 3B is an isometric view of a thermal receiver pipe of an STEC system in accordance with one embodiment of the invention.

FIG. 2 shows a bearing assembly 20 together with reflector stays 14c and bearing stays 20a without an installed thermal pipe. FIG. 2A shows a cross section of a bearing assembly and FIG. 2B is an exploded assembly drawing of the bearing assembly. FIGS. 3 and 3A show the bearing assembly with a partially installed thermal pipe 25. FIG. 3B shows an embodiment where a thermal pipe 25 has a flange 25b that is used to connect pipe sections together or to other pipes 25d, such other pipes can be rigid pipes, flexible hoses or flexible pipes. FIGS. 5A to 5E also show the bearing assembly together with reflector stays 14c and bearing stays 20a.

Each bearing assembly 20 includes a stationary portion 50a and a pivoting portion 50b. Generally, a thermal pipe is supported by non-rotating support plates 50c on either side of the bearing assembly. The support plates are connected to the bearing stays 20a and are thus supported by the building.

The pivoting portion 50b includes a bearing race 50d operatively connected between the support plates and that engages against the fixed thermal pipe 25 such that the reflector assembly 14 is suspended from and can rotate about the thermal pipe.

As shown, the bearing assembly 20 is designed to facilitate installation in sections within a building and whilst a building is being assembled. The bearing assembly 20 is described with reference to the steps of installation which includes the following general steps:

Bearing stay 20a installation as per FIGS. 1 to 3B and 5A to 5E—Three bearing stays 20a are connected to upper stay connector 50e. The bearing stays 20a are connected to the building and adjusted to the correct height and position within the building with turnbuckles 20b.

Outer support plate 50a positioning—One of the outer support plates 50a is attached to the bearing stays through stay connector 50e. As shown, each outer support plate 50a includes two halves 50f, 50g which can each connect to stay connector 50e. Support plate 50f may be installed initially. Depending on installation protocol, second half 50g may be connected to stay connector 50e or the thermal pipe is lifted and held in position against support plate 50f prior to connection of support plate half 50g. Either way, once thermal pipe 25 is in position and secured with support plates 50a, 50b, 50f, 50g multiple sections of thermal pipe 25 can be installed with support provided by the support plates. As shown in FIG. 3, the end of thermal pipe section 25 may protrude slightly beyond the support plate wherein adjacent sections of thermal pipe abut one another between the support plates. This provides support and alignment of the pipe sections 25 during installation.

Each thermal pipe section 25 preferably includes a beveled end 25a allowing a weld bead (not shown) to be placed within a recess defined by beveled edges 25a between two abutting pipe sections, to attach and seal each pipe section together. At this stage the bearing race 50h, 50i is not installed thus providing access for welding.

After installation and welding of pipe sections, the bearing race 50h, 50i is installed within the bearing assembly and around the thermal pipe 25. Each bearing race includes a rotating outer portion 50h and an inner non-rotating portion 50i. Each portion is comprised of two half sections 50h1, 50h2, and 50i1, 50i2 enabling installation within the support plates and around the thermal pipe 25.

The rotating outer portion 50h of the bearing assembly is connected to reflector connector 51 and reflector stays 14c, in the embodiment of FIGS. 1 to 3B and 5A to 5E. In the case of FIG. 6A to 6G, the rotating outer portion 50H is connected to rigid bearing supports 20C connected in turn to the reflector assembly 14. Fixed portion 50i of the bearing race is connected to plates 50c which rest on the outer surface of the thermal pipe.

Reflector assembly 14 Installation—A section of reflector assembly (i.e. the reflector and support frame) are lifted into position and connected to cable stays 14c, in the case of FIGS. 1 to 3B and 5A to 5E to be suspended from the bearing assembly. Alternately the reflector assembly is supported by support post 15c that is fixed to the foundation 15 of the building, as illustrated in FIGS. 6A to 6G and 9 to 9C.

The bearing race includes high temperature materials such as graphite impregnated bronze that provide proper lubrication of the running surfaces at maximum operating temperature.

Reflector System Actuation

The reflector assembly of FIGS. 1 to 3B and 5A to 5E is pivoted about the bearing assembly by an actuation system consisting of a wire rope 61 and motor drive 63 as shown in FIG. 1B. A wire rope has first 61a and second 61b ends fixed to the support frame 14b with wire rope passing through a series of pulleys 63a positioned on the support frame and building frame such that when the motor 63 is actuated the support frame 14b is lifted thereby rotating the reflector assembly 14 about the bearing assembly 20. A tensioning mechanism 62 is used to take up slack and maintain tension on the wire rope 61.

Thus, the reflector assembly can be oriented relative to incoming solar radiation to position the reflector assembly such that incoming solar radiation can be focused on the thermal pipe.

Figure 6A:
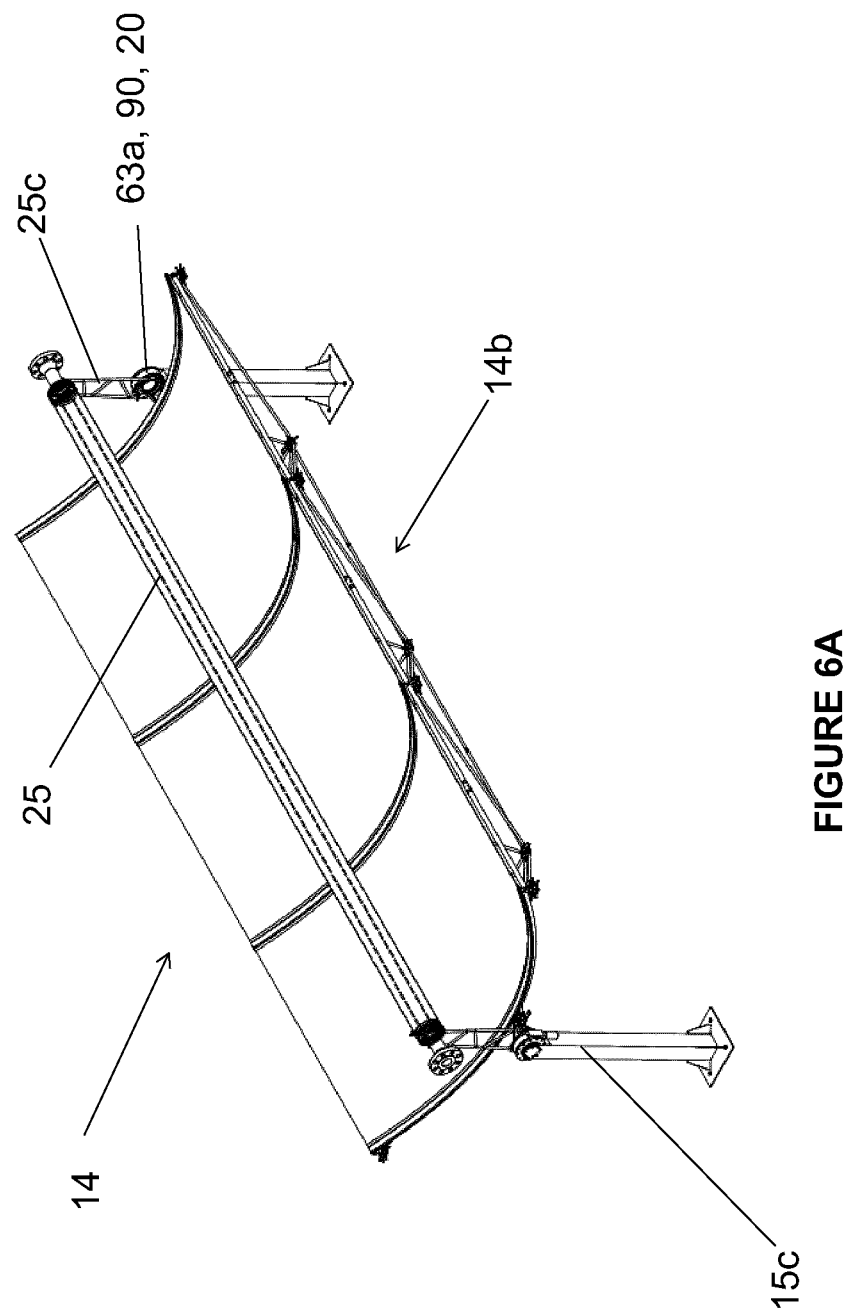
FIG. 6A is a top perspective view of a third embodiment of a reflector system, showing a bearing system and thermal receiver pipe of a STEC system.
Figure 6B:
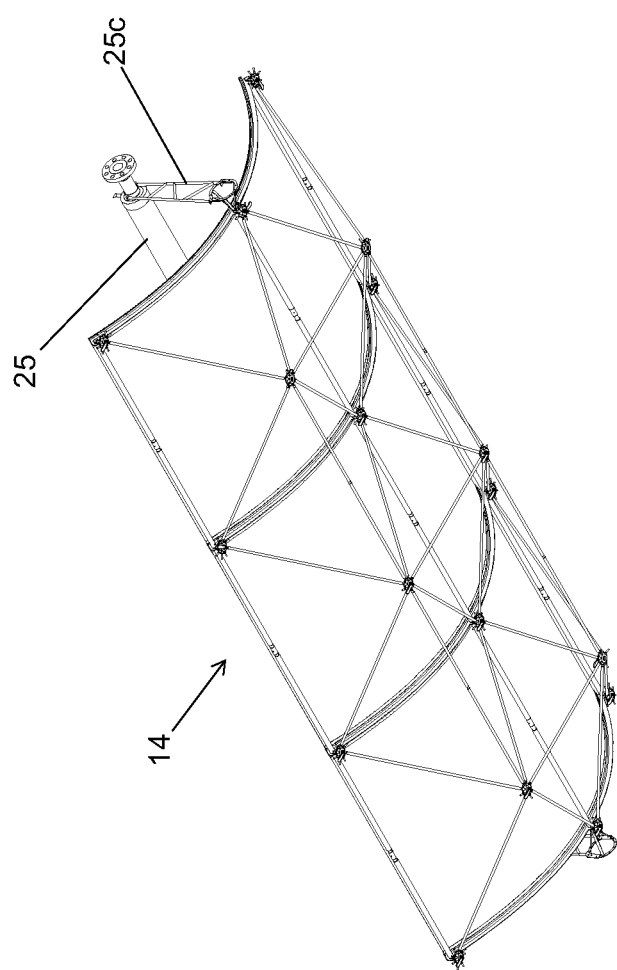
FIG. 6B is a bottom perspective view of the reflector system of FIG. 6A.
Figure 6C:
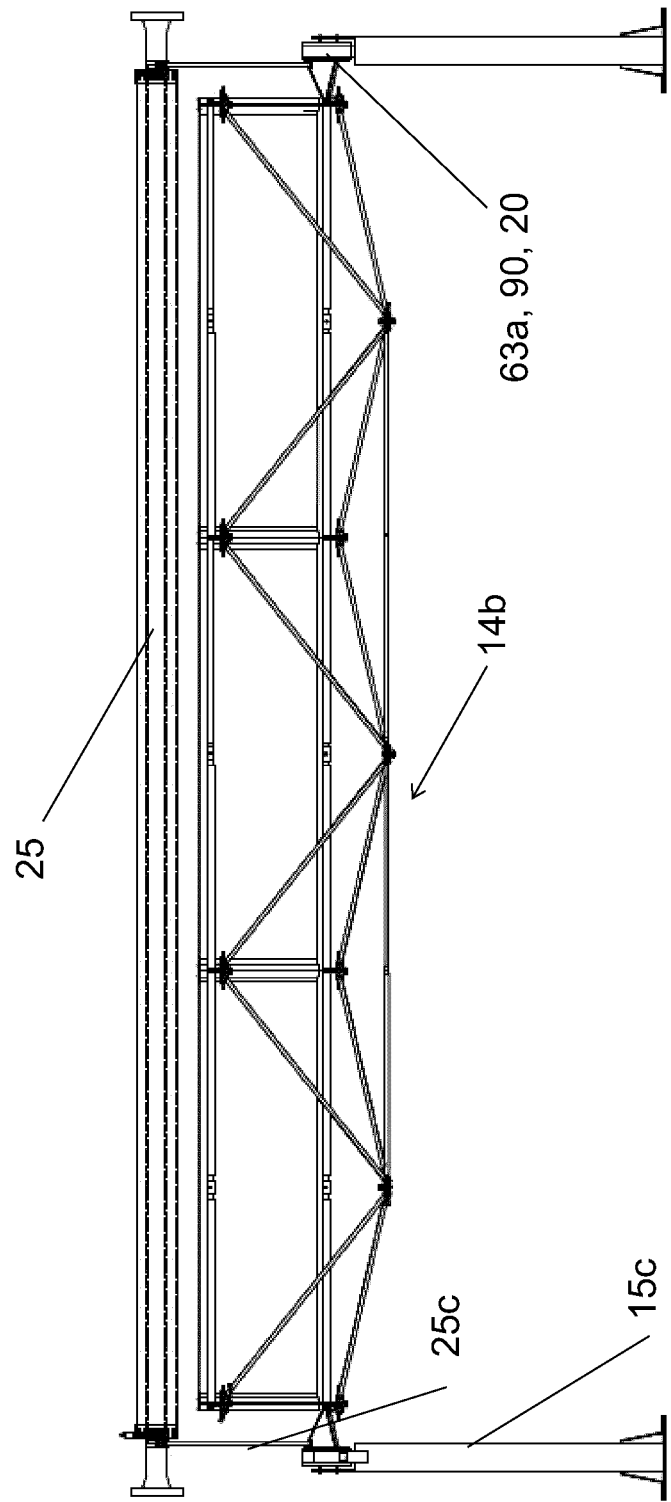
FIG. 6C is a side elevation view of the reflector system of FIG. 6A.
Figure 6D:
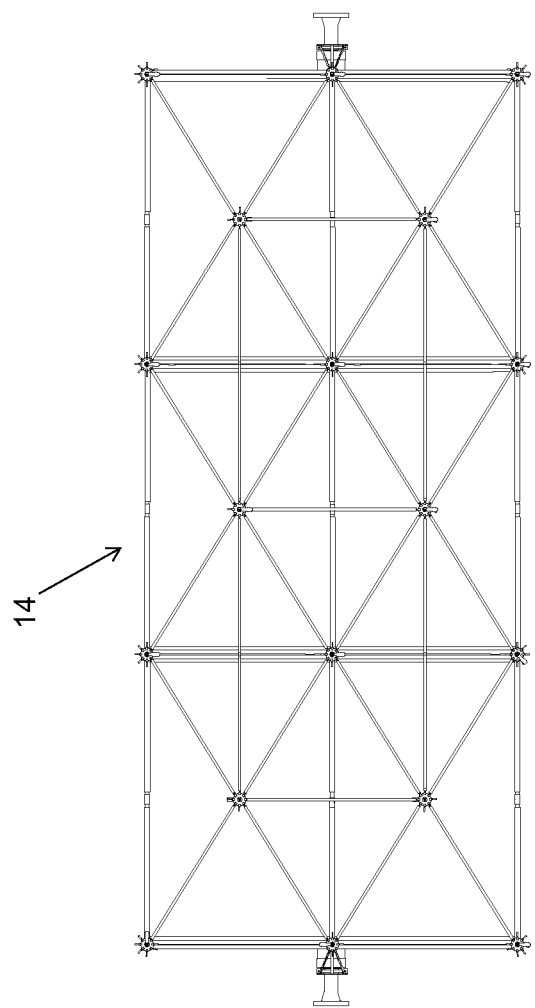
FIG. 6D is a bottom plan view of the reflector system of FIG. 6A.
Figure 6E:
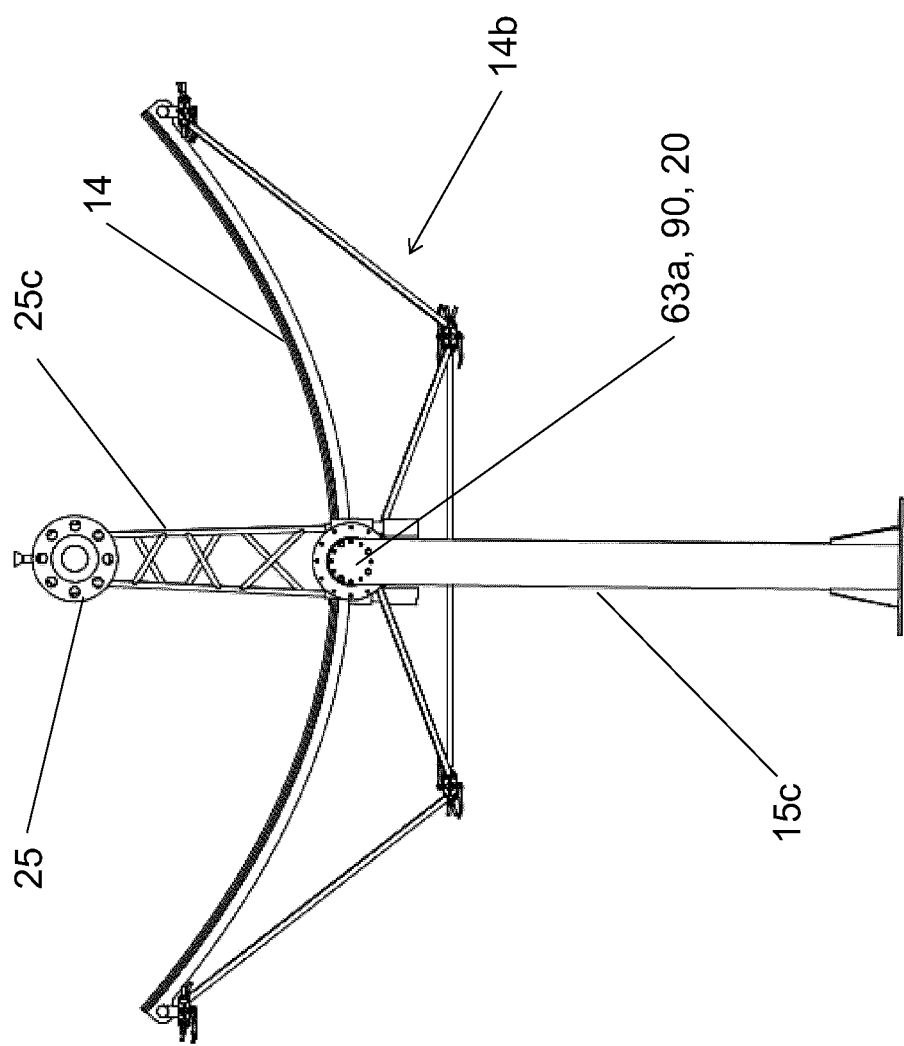
FIG. 6E is an end elevation view of the reflector system of FIG. 6A.
Figure 6F:
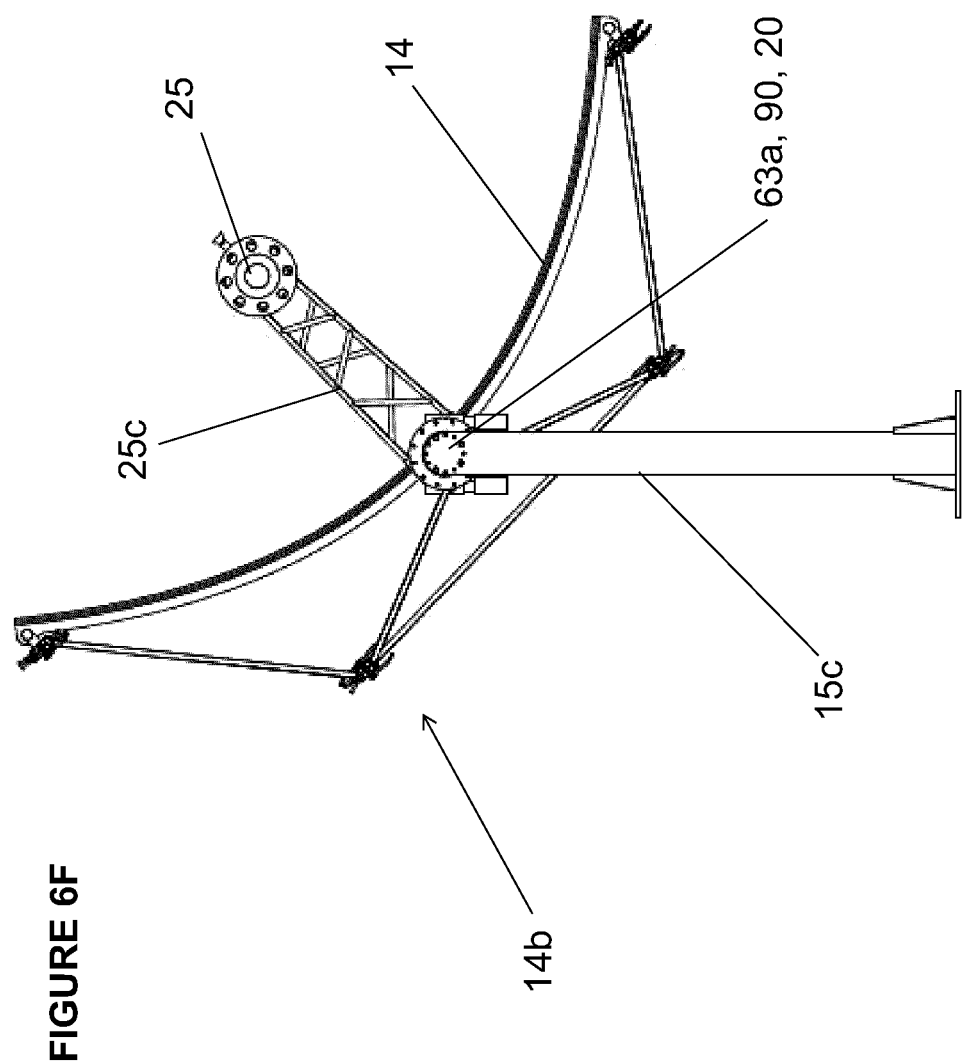
FIG. 6F is an end elevation view of the reflector system of FIG. 6A in a rotated position.
Figure 7A:
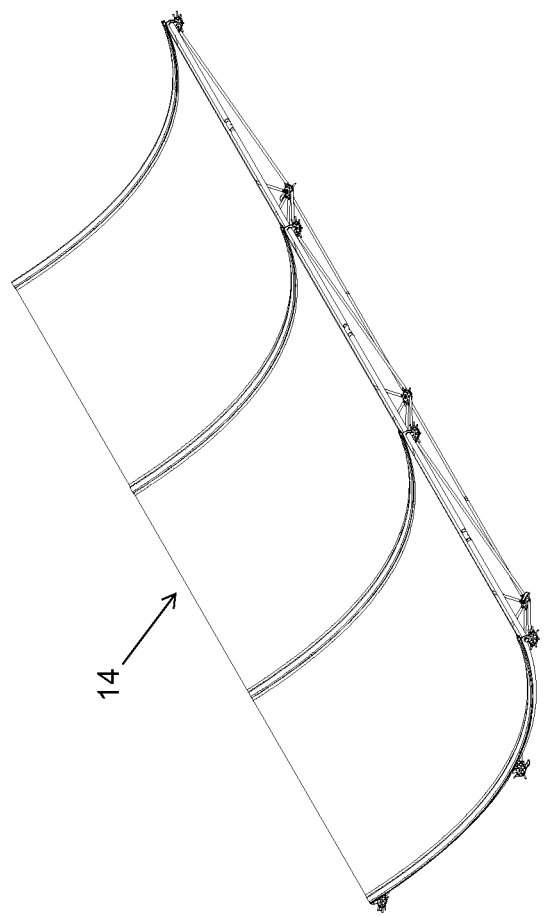
FIG. 7A is a top perspective view of the reflector system of FIG. 5A.
Figure 7B:
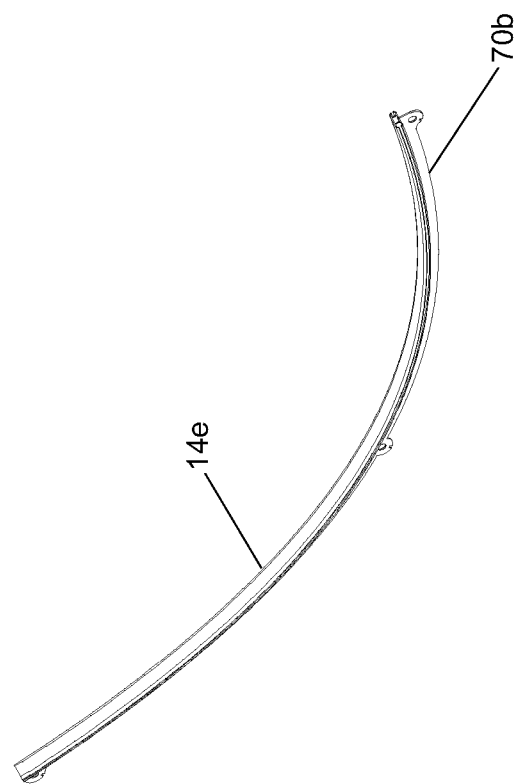
FIG. 7B is a perspective view of one embodiment of a reflector arch.
Figure 7C:
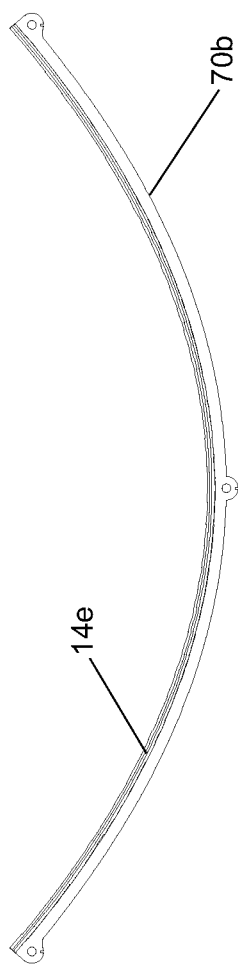
FIG. 7C is a side elevation view of the reflector arch of FIG. 7B.
Figure 7D:
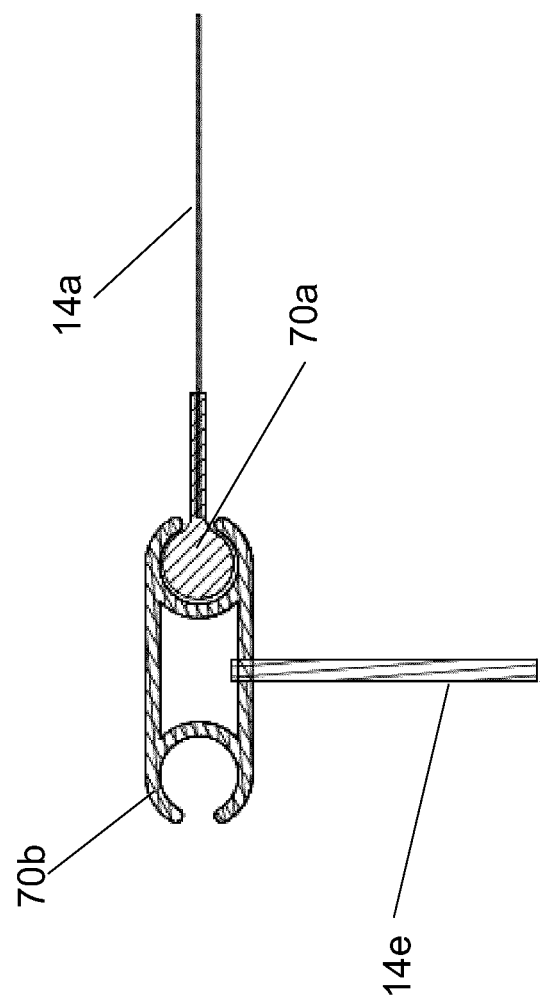
FIG. 7D is a side cross sectional view of a section of reflector with bead and parabolic membrane with attachment system.

In an alternate embodiment as illustrated in FIGS. 6A to 6G and 9 to 9C, the actuation system 90 includes a central single axis geared system connected to a drive motor 63a where actuation of the motor rotates the thermal pipe 25 and reflector assembly 14. In FIGS. 6A to 6G and FIGS. 9 to 9C, the rigid support 25c connects the thermal pipe 25 to and the reflector assembly 14 and support post 15c rotatably connects to the rigid support 25c and supports the assembly on the foundation 15. A drive motor 63a and gear actuation system 90 connected between the support post 15c and the rigid support 25c causes rotation of the rigid support 25c together with the reflector assembly 14 and the thermal pipe 25 about an axis of rotation defined by the connection of the support post 15c and the rigid support 25c. This is illustrated in FIG. 6F. The gear actuation system 90 can be a worm gear or a slew drive or similar system. A slew drive for the present purposes can be interpreted as containing an integrated geared actuation system and a bearing support system. Bearing assembly 20, also located at the connection of support post 15c and rigid support 25c also relative rotation of the reflector assembly 14/thermal pipe 25 relative to support post 15c.

In the arrangement of FIGS. 6A to 6G and FIGS. 9 to 9C, the thermal pipe 25 can be connected to a flexible hose 25d or otherwise flexible pipe 25d to allow for rotation of the thermal pipe 25 with the reflector assembly 14. With reference FIG. 6G which is a partial elevation view of the assembly and FIGS. 9 to 9C, the other pipe 25d may be rigid, but includes a rotatable pipe connection 25e to allow for rotation of the thermal pipe 25 with reflector assembly 14. The rotatable pipe connection 25e is more preferably located in the same axis of rotation as that of the thermal pipe 25 and reflector assembly 14.

System Modularity and Maintenance

The system has been created with consideration of the DFMSA (Design for Manufacturing, Shipping, and Assembly) engineering methodology and modular design to reduce time and cost in manufacturing, assembly, and maintenance. Each of the components including the foundation structures, arches, membranes, thermal pipes, reflector assembly and bearing assembly can be manufactured with consistent dimensions as a single module enabling larger capacity systems to be assembled by interconnecting a number of modules. The modular design further enables simplified maintenance as may be required by enabling particular components to be removed/replaced by identical or upgraded components.

The modularity of the system allows for the system to be taken apart, collapsed, and easily shipped to other locations for set up.

For example, a single module may include a fixed number of arches and envelope material to cover that number of arches. As shown in FIG. 1A, a module may include multiple arch pairs (e.g. 2-6) designed to be spaced on appropriate centers, corresponding pre-cut to length Keder channels, pre-cut membrane with welded edge beads cut to an appropriate width, ridge members and fixed length stringers.

A reflector assembly module may include two bearing assemblies and stays, fixed length thermal pipe and sufficient reflector and frame materials to assemble a fixed length reflector assembly for the module. Reflector assemblies may be comprised of smaller or larger reflector panels and cross members as required.

Accessory modules may include other components including flooring, TES modules, PV panels, water collection and drainage channels, water storage modules, doors, end covers, and foundation equipment.

Control equipment may also be provided in modules

As such, the design and deployment of a particular installation can be simplified by utilizing multiples of the above modules.

Deployment and Operation

The STEC system will usually be deployed along an east-west or north-south axis to enable the reflector assemblies to track the sun perpendicular to deployment orientation. Deployment orientation may be favored to either extend the system thermal generation over more months into the shoulder seasons or provide a higher peak thermal generation output during the summer. Generally, if the system is east-west aligned, at dawn and sunset, with the sun low to the horizon, the reflector assembly will be lifted from a lower neutral position to enable the reflector assembly to be focused on the thermal pipe. As the sun rises in the sky, the system will adjust and be lowered towards the neutral position and as the sun lowers in the sky, the system will adjust and be lifted as sunset approaches.

Figure 11:
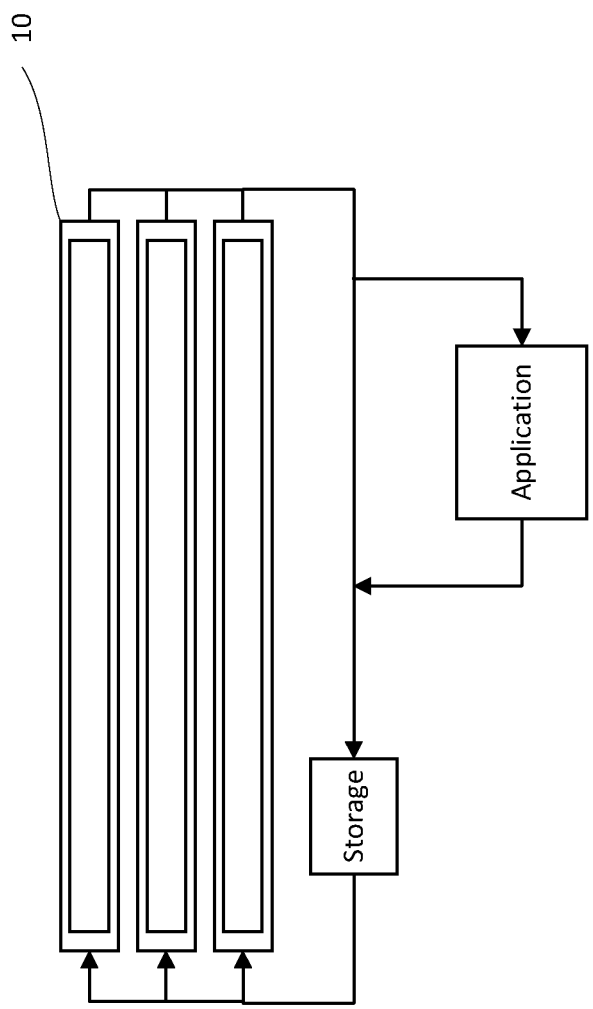
FIG. 11 is a schematic overview of an STEC installation in accordance with one embodiment of the invention.
Figure 11A:
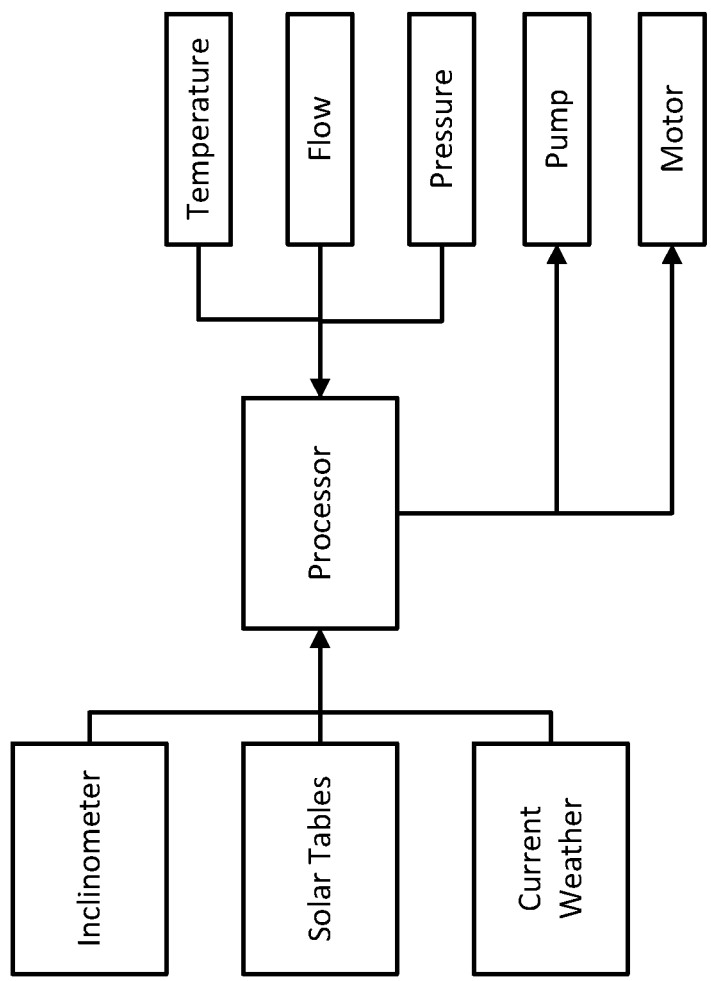
FIG. 11A is an overview of an STEC control system in accordance with one embodiment of the invention.

As shown in FIG. 11A, the control of the system is automated via a controller that receives data from various sensors. Such sensors may include one or more inclinometers on the reflector assembly, temperature sensors deployed along the thermal pipe, pressure and/or flow sensors within each thermal pipe.

The controller may operate under a range of control schemes to optimize heat collection efficiency.

In one embodiment, the system will utilize sun position data for each day of the year (including hour and minute data) for the geographic location and adjust the angle of inclination based on the sun's position. That is, the controller will raise or lower the reflector assembly based on the known sun's position at a particular minute and hour of each day.

Confirmation that the system is at the correct angle may be confirmed by inclinometers. The inclinometers may also provide system fault checking data to ensure that a longer reflector assembly is correctly aligned along its entire length and not experiencing torsion.

The flow of thermal fluid through the thermal pipe is controlled by external pumps that may increase or decrease flow through the pipe based on measured temperatures along the length of the thermal pipe and may take into account local weather. Continuous thermal fluid circulation may be utilized for freeze-protection together with thermal storage. Material of manufacture of the thermal pipe, as well as choice of, thermal fluid, chemical treatment of thermal fluid, and inclusion of additives such as freezing point depressors can also be used individually or in combination to manage cold temperature operation.

Applications

As described above, an STEC system allows for the heating of a thermal fluid within the thermal pipe.

In one application, solar thermal energy is transferred to the thermal fluid that is used directly for commercial and industrial applications that require heat in their processes or building HVAC systems as shown in FIG. 11.

In one application, the STEC integrates with existing industrial processes through direct steam generation (DSG) and the use of lower grade process water as the thermal fluid. This allows for minimal integration infrastructure or process disruption to the many industrial applications that use steam directly as a heating medium through the elimination of heat exchangers or other equipment with thermal losses and a transition between different thermal fluids and heating loops.

The system is designed to be economically deployable in harsh climates where conventional systems are not feasible. These harsh conditions include both high and low temperatures, heavy snow and rainfall, high humidity, strong winds, dust and sandstorms and high frequencies of hail.

The foregoing design provides advantages over previous systems including effective protection of the reflector assembly to the environment. The high slope building enclosure minimizes the risk of snow/dust/sand accumulation and thereby reduces down-time due to fouled and/or shaded reflectors.

The building envelope enables utilization of a lightweight reflector assembly that reduces overall material and manufacturing costs. The modular design provides efficiency in the manufacture, assembly and maintenance of the system.

The bearing assembly enables ready access to the thermal pipe for maintenance or replacement.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A solar reflector system comprising:
   a building enclosing at least a portion of a thermal pipe;
   a reflector assembly comprising a support frame and a parabolic reflector, wherein the support frame is configured to support the parabolic reflector via a plurality of support members interconnected by cross members, wherein the cross members are rotatably interconnected via one or more connector nodes such that plurality of support members and cross members are (i) collapsible and (ii) expandable for forming the support frame;
   a flexible membrane, wherein the parabolic reflector comprises a first attachment system configured to attach the flexible membrane to the parabolic reflector;
   a tensioning system configured to hold the flexible membrane substantially taut along a top of the parabolic reflector, wherein the tensioning system comprises at least one of the one or more connector nodes, wherein the at least one of the one or more connector nodes allows for an individual support member to be set to at least one angle of a plurality of angles when the support frame is formed; and
   an actuation system configured to move the reflector assembly within the building in manner suitable to move the parabolic reflector within the building while maintaining the reflector assembly at a distance from the thermal pipe that is sufficient for the parabolic reflector to focus solar radiation received by the parabolic reflector onto the thermal pipe.

2. The solar reflector system of claim 1, wherein an individual connector node is both (i) lockable to hold one or more cross members in a set position and (ii) releasable to allow rotation of the one or more cross members relative to the individual connector node.

3. The solar reflector system of claim 1, wherein the building is formed at least in part from a plurality of structural members and a transparent membrane covering at least a portion of the plurality of structural members, wherein the transparent membrane comprises an edge bead along at least a portion of at least one side of the transparent membrane, wherein an individual structural member comprises a track configured to receive the edge bead of the transparent membrane, and wherein the track comprises a clamping system configured to create a seal between the individual structural member and the transparent membrane where the edge bead is seated within the track.

4. The solar reflector system of claim 1, wherein the reflector assembly is at least partially supported by one or more rigid reflector stays, wherein the thermal pipe is connected to a bearing assembly, and wherein each rigid reflector stay is physically coupled to both the reflector assembly and the bearing assembly.

5. A solar reflector system comprising:
 a building formed at least in part from a plurality of structural members and a transparent membrane covering at least a portion of the plurality of structural members;
 a thermal pipe supported in the building;
 a reflector assembly comprising a support frame and a parabolic reflector, wherein the support frame is configured to support the parabolic reflector via a plurality of support members interconnected by cross members, wherein the cross members are rotatably interconnected via one or more connector nodes such that the plurality of support members and cross members are (i) collapsible and (ii) expandable for forming the support frame;
 a flexible membrane, wherein the parabolic reflector comprises a first attachment system configured to attach the flexible membrane to the parabolic reflector;
 a tensioning system configured to tension the flexible membrane, wherein the tensioning system comprises at least one of the one or more connector nodes, wherein the at least one of the one or more connector nodes allows for an individual support member to be set to at least one angle of a plurality of angles when the support frame is formed; and
 an actuation system configured to move the reflector assembly within the building in a manner suitable to move the parabolic reflector within the building while maintaining the reflector assembly at a distance from the thermal pipe that is sufficient for the parabolic reflector to focus solar radiation received by the parabolic reflector onto the thermal pipe.

6. The solar reflector system of claim 5, wherein the plurality of structural members comprises a plurality of arch pairs, wherein each arch pair of the plurality of arch pairs comprises a pointed barrel arch having a lower slope angle adjacent to a lower outer surface edge of each arch and an upper slope angle adjacent to an upper outer surface edge of each arch, and wherein the lower slope angle between a horizontal axis and the lower outer surface edge is greater than 90 degrees and less than 110 degrees and the upper slope angle between the upper outer surface edge and the horizontal axis is greater than 40 degrees.

7. The solar reflector system of claim 6, where an individual arch pair of the plurality of arch pairs has a vertical height substantially equal to a horizontal width of the individual arch pair between a lower edge of the individual arch pair.

8. The solar reflector system of claim 5, further comprising a membrane attachment system comprising a membrane track configured to connect the transparent membrane to an outer surface of each structural member, wherein the membrane track comprises a membrane clamping system configured to attach and seal at least a portion of the transparent membrane to the membrane track, wherein the transparent membrane comprises an edge bead configured to engage with the membrane clamping system, and wherein the transparent membrane comprises a material selected from the group consisting of ethylene tetrafluoroethylene (ETFE), polycarbonate (PC), polyethylene (PE) and polyethylene terephthalate (PET).

9. The solar reflector system of claim 5, wherein the actuation system comprises a cable connected to the reflector assembly, wherein the cable is connected to a drive motor on the building, and wherein actuation of the drive motor causes the reflector assembly to move.

10. The solar reflector system of claim 5, wherein the actuation system is configured to rotate the reflector assembly and the thermal pipe together along a common axis of rotation.

11. The solar reflector system of claim 5, wherein an individual connector node is both (i) lockable to hold one or more cross members in a set position and (ii) releasable to allow rotation of the one or more cross members relative to the individual connector node.

12. The solar reflector system of claim 5, wherein the first attachment system comprises a track, wherein the flexible membrane comprises an edge bead formed along an edge of the flexible membrane, and wherein the track of the first attachment system is configured to receive the edge bead of the flexible membrane.

13. The solar reflector system of claim 5, further comprising a bearing assembly, wherein the bearing assembly comprises:
 a stationary portion and a pivoting portion supporting the thermal pipe;
 the stationary portion having two support plates and at least two bearing stay connectors;
 wherein the pivoting portion comprises a bearing race having an inner race connected between the two support plates for engagement against the thermal pipe, and an outer race having a reflector assembly connector wherein the reflector assembly connector is configured to facilitate motion of the reflector assembly relative to the thermal pipe;
 wherein the two support plates are separated by a gap enabling two sections of the thermal pipe to be joined together when ends of the two sections of the thermal pipe are positioned between the two support plates;
 wherein each support plate comprises two half sections configured to engage each other and at least two bearing stay connectors; and
 wherein each of the inner race and outer race include two half sections enabling installation of the pivoting portion over the thermal pipe after the thermal pipe has been installed within the stationary portion.

14. The solar reflector system of claim 5, wherein the transparent membrane comprises an edge bead along at least a portion of at least one side of the transparent membrane, wherein an individual structural member comprises a track configured to receive the edge bead of the transparent membrane, and wherein the track comprises a clamping system configured to create a seal between the individual structural member and the transparent membrane where the edge bead is seated within the track.

15. The solar reflector system of claim 5, wherein individual support members and cross members of the support frame are at least partially formed from one of steel, aluminum, or plastic.

16. The solar reflector system of claim 5, wherein the reflector assembly is at least partially supported by a support post that is fixed to a foundation of the building.

17. The solar reflector system of claim 5, wherein the parabolic reflector comprises (i) a reflective film on one side of the flexible membrane, and (ii) a backing.

* * * * *